(12) United States Patent
Nakadori

(10) Patent No.: US 10,160,449 B2
(45) Date of Patent: Dec. 25, 2018

(54) CRUISE CONTROL DEVICE

(71) Applicant: Toyota Jidosha Kabushiki Kaisha, Toyota-shi (JP)

(72) Inventor: Minoru Nakadori, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 343 days.

(21) Appl. No.: 15/211,427

(22) Filed: Jul. 15, 2016

(65) Prior Publication Data

US 2017/0015321 A1    Jan. 19, 2017

(30) Foreign Application Priority Data

Jul. 17, 2015   (JP) .................................. 2015-142962

(51) Int. Cl.
| | |
|---|---|
| *B60W 10/06* | (2006.01) |
| *B60W 10/11* | (2012.01) |
| *B60W 30/14* | (2006.01) |
| *B60W 30/16* | (2012.01) |
| *B60W 10/184* | (2012.01) |

(52) U.S. Cl.
CPC ............ *B60W 30/16* (2013.01); *B60W 10/06* (2013.01); *B60W 10/11* (2013.01); *B60W 10/184* (2013.01); *B60W 30/143* (2013.01); *B60W 2520/10* (2013.01); *B60W 2550/302* (2013.01); *B60W 2550/308* (2013.01); *B60W 2710/0605* (2013.01); *B60W 2710/0666* (2013.01); *B60W 2710/1005* (2013.01); *B60W 2720/10* (2013.01); *B60W 2720/106* (2013.01)

(58) Field of Classification Search
None
See application file for complete search history.

(56) References Cited

U.S. PATENT DOCUMENTS

| | | | | |
|---|---|---|---|---|
| 5,036,936 A | * | 8/1991 | Kawano | B60K 31/047 |
| | | | | 123/350 |
| 2001/0056318 A1 | * | 12/2001 | Tashiro | B60W 10/04 |
| | | | | 701/48 |

(Continued)

FOREIGN PATENT DOCUMENTS

| | | |
|---|---|---|
| JP | 2009-40306 A | 2/2009 |
| JP | 2012-187965 | 10/2012 |

(Continued)

*Primary Examiner* — Jacob S. Scott
(74) *Attorney, Agent, or Firm* — Oblon, McClelland, Maier & Neustadt, L.L.P.

(57) ABSTRACT

A cruise control device of a vehicle including an engine and a multistep automatic transmission, includes an acceleration operation part, a driving-force operation part, and a control part that carries out acceleration control in which a driving force is brought close to a target driving force by changing a throttle-valve opening of the engine at least to bring the driving force close to a demand driving force. The control part carries out the acceleration control in a target gear shift stage fixed mode that is a control mode in which the acceleration control is carried out in a state where change of a gear shift stage is forbidden after changing the gear shift stage from a current gear shift stage that is a gear shift stage at present to a target gear shift stage that is a gear shift stage required for obtaining the target driving force at a stretch.

7 Claims, 12 Drawing Sheets

(56) References Cited

U.S. PATENT DOCUMENTS

| | | |
|---|---|---|
| 2009/0043466 A1 | 2/2009 | Nakai et al. |
| 2015/0175162 A1 | 6/2015 | Nakadori |
| 2016/0009283 A1* | 1/2016 | Tokimasa .............. B60W 30/16 |
| | | 701/96 |

FOREIGN PATENT DOCUMENTS

| | | |
|---|---|---|
| JP | 2014-237391 A | 12/2014 |
| WO | WO 2014/038076 A1 | 3/2014 |

* cited by examiner

CRUISE CONTROL DEVICE

TECHNICAL FIELD

The present invention relates to a cruise control device for a vehicle, which can promptly attain target acceleration while reducing worsening of an operation feeling at the time of acceleration control in a vehicle equipped with a multistep automatic transmission.

BACKGROUND ART

In a vehicle equipped with a multistep automatic transmission (including a non-stage transmission which performs stepped transmission (CVT: Continuously Variable Transmission), etc. Henceforth, it may be referred to as an "AT."), the number of gear shift stages tends to increase, for example, for the purpose of further improving fuel consumption and/or acceleration performance, etc.

On the other hand, in a cruise control device (including an adaptive cruise control (ACC) device, etc. Henceforth, it may be collectively referred to as a "CC."), it has been known to carry out acceleration control accompanied by what is called "gradient restriction" in which an upper limit is set for an increment of the acceleration per unit time (increase rate of acceleration) (alternatively, driving force or torque), for example, at the time of an initiation of constant-speed running control (will be mentioned later in detail) and a reversion (resume) after release of the constant-speed running control, etc., for example, for the purpose of reducing worsening of an operation feeling associated with rapid alteration of acceleration, etc. (for example, refer to the Patent Document 1 (PTL1)).

CITATION LIST

Patent Literature

[PTL1] International Publication WO2014/038076

SUMMARY OF INVENTION

In the above-mentioned acceleration control accompanied by "gradient restriction", since a demand value of acceleration (alternatively, driving force or torque) is increased at an increase rate not more than the above-mentioned upper limit, a gear shift stage of a multistep automatic transmission is sequentially changed to a gear shift stage according to vehicle speed and driving force demanded at that time, rather than is changed to a gear shift stage, at which target acceleration is obtained, at a stretch. Specifically, based on a predetermined shift line, a gear shift stage is changed one by one. As a result, in the acceleration control accompanied by gradient restriction, a gear shift stage is changed step by step until reaching a gear shift stage, at which target acceleration is obtained, and the number of times of gear shift may increase.

In the above-mentioned case, a shock associated with change of a gear shift stage (gear shift) (a gear shift shock) occurs multiple times until reaching a gear shift stage, at which target acceleration is obtained. Furthermore, since transmission of driving force is interrupted temporarily and acceleration is interrupted during a gear shift, a time period required until reaching target acceleration becomes longer. In addition, since an attainment to target acceleration is delayed as mentioned above, there is a possibility of causing what is called an "overshooting" that generates excessive acceleration larger than acceleration to be generated properly. That is, in a cruise control device according to conventional technology, there is a possibility that worsening of an operation feeling may occur at the time of acceleration control in a vehicle equipped with a multistep automatic transmission or an achievement of target acceleration may be delayed.

Therefore, one of the objectives of the present invention is to provide a cruise control device which can promptly attain target acceleration while reducing worsening of an operation feeling at the time of acceleration control in a vehicle equipped with a multistep automatic transmission.

A cruse control device according to the present invention (may be referred to as a "present invention device" henceforth) is applied to a vehicle equipped with an internal combustion engine and a multistep automatic transmission.

The above-mentioned internal combustion engine is not limited in particular, may be any of a gasoline internal combustion engine or a diesel internal combustion engine, for example, and neither a fuel injection mode nor a fuel ignition mode nor existence of charger (for example, supercharger and turbocharger) nor a number of cylinders, etc. are limited. The above-mentioned multistep automatic transmission is not limited in particular as long as it is a motive-power transmission mechanism in which a reduction ratio can be changed in a stepwise fashion. Therefore as mentioned above, a non-stage transmission (CVT) which performs stepped transmission is also included in the above-mentioned multistep automatic transmission. Furthermore, a dual clutch transmission (DCT) is also included in the above-mentioned multistep automatic transmission.

Basically, the present invention device has the same configuration as a common cruise control device according to a conventional technology. Specifically, the present invention device comprises an acceleration operation part, a driving-force operation part, and a control part.

The acceleration operation part computes target acceleration that is said vehicle's acceleration required for accelerating vehicle speed which is a running speed of said vehicle to target vehicle speed. The driving-force operation part computes target driving force that is said vehicle's driving force corresponding to said target acceleration, and computes demand driving force that changes to said target driving force so that magnitude of a change rate of acceleration or driving force or driving torque of said vehicle does not exceed a predetermined upper limit. The control part which carries out acceleration control in which the driving force of said vehicle is brought close to said target driving force by changing throttle-valve opening of said internal combustion engine at least to bring the driving force of said vehicle close to said demand driving force.

In accordance with the above, the control part carries out acceleration control accompanied by the above-mentioned "gradient restriction." At this time, the acceleration operation part may compute a variation pattern of acceleration so that magnitude of a change rate of acceleration or driving force or driving torque of the vehicle does not exceed a predetermined upper limit, and the driving-force operation part may compute a variation pattern of demand driving force corresponding to the computed variation pattern of acceleration. Alternatively, the driving-force operation part may compute a variation pattern of demand driving force so that magnitude of a change rate of demand driving force until driving force (in a driving wheel) of a vehicle reaches target driving force does not exceed a predetermined upper limit. Alternatively, when acceleration control is carried out based on driving torque (that is torque in a driving wheel) in place of driving force as will be mentioned later, a variation pattern of driving torque may be computed so that the magnitude of a change rate of driving torque until driving torque reaches to target driving torque corresponding to target driving force does not exceed a predetermined upper limit.

In the above, the present invention device is the same as a common cruise control device according to a conventional technology which carries out the above-mentioned gradient restriction. As mentioned above, in a cruise control device according to a conventional technology, there is a possibility that worsening of an operation feeling or delay in an achievement of target acceleration may occur at the time of acceleration control in a vehicle which comprises a multistep automatic transmission.

Then, in acceleration control in which driving force of said vehicle is brought close to said target driving force, as for the driving force of said vehicle, the control part, which the present invention device comprises, carries out the above-mentioned gradient restriction according to a variation pattern of demand driving force computed by the driving-force operation part. On the other hand, as for a gear shift stage of said multistep automatic transmission, the control part changes it to a target gear shift stage that is a gear shift stage required for obtaining said target driving force at a stretch. That is, in the present invention device, demand driving force is used as driving force for vehicle control (vehicle-control driving force), and target driving force is used as driving force for change of a gear shift stage of a multistep automatic transmission (gear-shift driving force).

More specifically, said control part changes a gear shift stage of said automatic transmission from a current gear shift stage that is a gear shift stage of said automatic transmission at present to a target gear shift stage that is a gear shift stage of said automatic transmission required for obtaining said target driving force at a stretch. Thereafter, said control part carries out said acceleration control in a target gear shift stage fixed mode that is a control mode in which said acceleration control is carried out in a state where change of the gear shift stage of said automatic transmission is forbidden.

In accordance with the present invention device having a configuration as mentioned above, worsening of an operation feeling associated with rapid alteration of acceleration can be reduced by execution of gradient restriction, and the number of times of gear shift until reaching a target gear shift stage can be reduced by changing the gear shift stage of a multistep automatic transmission to the target gear shift stage at a stretch. As a result, multiple occurrences of a shock associated with change of a gear shift stage (gear shift) of a multistep automatic transmission (a gear shift shock) during a time period until reaching a target gear shift stage, delay in an attainment of target acceleration, or an occurrence of an overshooting of acceleration can be reduced.

By the way, as for change of a gear shift stage (gear shift) of a multistep automatic transmission, for example, for the purpose of reduction of a gear shift shock, etc., it is common that what is called "conformation" for optimizing a drive mode of constituent members of a multistep automatic transmission is performed in advance and a gear shift is carried out according to the conformed drive mode.

Since a huge man-hour is needed for the above-mentioned conformation, it is not realistic to perform conformation for all the theoretically conceivable gear shift patterns, and it is common that conformation is performed only for gear shift patterns assumed in operation of a vehicle. For example, conformation is performed for a gear shift pattern according to vehicle speed and driving force demanded at that time (namely, a gear shift pattern based on a shift line). Furthermore, in a vehicle equipped with a mechanism for changing the gear shift stage of a multistep automatic transmission by a driver's operation (for example, what is called a "paddle shift", etc.), conformation is performed for gear shift patterns performed by the mechanism.

As mentioned above, it is common that conformation for reducing a gear shift shock is not carried out for all the theoretically conceivable gear shift patterns, and is carried out only for gear shift patterns assumed in operation of a vehicle. Therefore, there is a possibility that a gear shift shock which causes worsening of an operation feeling may occur when a gear shift corresponding to a gear shift pattern for which conformation is not performed is performed by the control part in the execution of the acceleration control in the above-mentioned target gear shift stage fixed mode.

Then, in the present invention device according to a preferable embodiment, the above-mentioned control part is configured to carry out the acceleration control in the above-mentioned target gear shift stage fixed mode only when a gear shift pattern from a current gear shift stage to a target gear shift stage corresponds to a gear shift pattern which is assumed in operation of a vehicle (namely, a gear shift pattern for which conformation is performed. Henceforth, it may be referred to as a "conformed gear shift pattern").

In the above case, the above-mentioned control part is configured so that, when a gear shift pattern from a current gear shift stage to "either gear shift stage which exists between the current gear shift stage and a target gear shift stage" corresponds to the "conformed gear shift pattern", the above-mentioned control part carries out the acceleration control in the above-mentioned target gear shift stage fixed mode according to the gear shift pattern. At this time, when two or more gear shift patterns corresponding to the "conformed gear shift pattern" exist, it is desirable to choose a gear shift pattern from the current gear shift stage to a "gear shift stage nearest to the target gear shift stage" among these two or more gear shift patterns.

In addition, the above-mentioned control part is configured so that, when no gear shift pattern corresponding to the "conformed gear shift pattern" exists among gear shift patterns from a current gear shift stage to "any gear shift stages which exist between the current gear shift stage and a target gear shift stage", the above-mentioned control part does not carry out the acceleration control in the above-mentioned target gear shift stage fixed mode. In this case, the above-mentioned control part may be configured to carry out normal acceleration control (that is, a gear shift is performed based on a predetermined shift line).

Namely, in the present invention device according to this embodiment, when there is one or more candidate gear shift stage corresponding to a conformed gear shift stage that is a gear shift stage to which a direct change from said current gear shift stage is previously assumed in said vehicle among candidate gear shift stages that are gear shift stages included in a group which consists of said target gear shift stage and gear shift stages existing between said current gear shift stage and said target gear shift stage, said control part sets, as a new target gear shift stage, a candidate gear shift stage nearest to said target gear shift stage among said one or more candidate gear shift stages, and carry out said acceleration control in said target gear shift stage fixed mode.

On the other hand, when there is no candidate gear shift stage corresponding to said conformed gear shift stage among said candidate gear shift stages, said control part carries out said acceleration control in a normal mode that is a control mode in which the gear shift stage of said automatic transmission is changed, according to said demand driving force and said vehicle speed, based on a predetermined shift line.

In accordance with the present invention device according to this embodiment, the acceleration control in the above-mentioned target gear shift stage fixed mode is carried out only in a gear shift pattern which corresponds to the above-mentioned "conformed gear shift pattern." As a result, a possibility that a gear shift corresponding to a gear shift pattern for which conformation is not performed may be performed by the control part and a gear shift shock which causes worsening of an operation feeling may occur is reduced.

By the way, as mentioned above, one of the objectives of the present invention is to provide a cruise control device which can promptly attain target acceleration while reducing worsening of an operation feeling at the time of acceleration control in a vehicle equipped with a multistep automatic transmission. In order to reduce a gear shift shock at the time of the acceleration control to achieve the above-mentioned objective, it is desirable to decrease the number of times of a gear shift in the acceleration control as much as possible. Ultimately, it is desirable to carry out the acceleration control without being accompanied by a gear shift.

Then, in the invention device according to another preferable embodiment, the above-mentioned control part is configured not to perform a gear shift when it is possible to obtain target driving force in the current gear shift stage.

That is, in the invention device according to this embodiment, said control part carries out said acceleration control at a current gear shift stage fixed mode that is a control mode in which said acceleration control is carried out in a state where the gear shift stage of said automatic transmission is maintained at said current gear shift stage, when maximum driving force which can be obtained in said current gear shift stage is not less than said target driving force.

In accordance with the present invention device according to this embodiment, a gear shift is not performed when it is possible to obtain target driving force in the above-mentioned current gear shift stage. Therefore, the number of times of a gear shift in acceleration control is reduced more effectively. As a result, multiple occurrences of a shock until reaching a target gear shift stage, delay in an attainment of target acceleration, or an occurrence of an overshooting of acceleration can be reduced more effectively.

By the way, in these days, a cruise control device which carries out follow-up running control in which inter-vehicular distance from a preceding vehicle is automatically kept constant, in addition to constant-speed running control (auto-cruise control) in which speed of an own vehicle is maintained constant as mentioned above, is becoming popular increasingly. Such a cruise control device is also referred to as an adaptive cruise control (ACC) device.

The constant-speed running control is control in which an own vehicle is made to run within a constant vehicle speed range by adjusting driving force and/or braking force according to gradient of a road surface and/or running load at the time of running on a motorway, such as a highway and a local highly specified road, for example. The follow-up running control is control in which an own vehicle is made to follow a preceding vehicle by adjusting driving force and/or braking force according to inter-vehicular distance from the preceding vehicle and/or relative velocity with respect to the preceding vehicle, etc. Either control contributes to improvement in running stability of an own vehicle, while reducing the burden of active accelerator operation and/or brakes operation by a driver.

Even during execution of the follow-up running control, when a preceding vehicle does not exist, and when vehicle speed of a preceding vehicle is faster than the target vehicle speed of an own vehicle, target driving force is never changed due to the running condition of the preceding vehicle in the above-mentioned acceleration control in the target gear shift stage fixed mode.

However, during a time period in which an own vehicle is following a preceding vehicle running at vehicle speed not higher than target vehicle speed of the own vehicle in follow-up running control, vehicle speed of the own vehicle is adjusted so that inter-vehicular distance between the preceding vehicle and the own vehicle does not become less than a predetermined lower limit (target driving force of the own vehicle is adjusted). Therefore, depending on running condition of the preceding vehicle, the target driving force may be changed frequently in the acceleration control in the above-mentioned target gear shift stage fixed mode, and a target gear shift stage of a multistep automatic transmission may also be changed frequently. As a result, there is a possibility that a large gear shift, such as a shift down to a first gear (low gear), for example, may be performed frequently, and there is a possibility that it may lead to worsening of an operation feeling.

Therefore, when the present invention device is an adaptive cruise control (ACC) device equipped with a follow-up running control function, it is desirable not to carry out acceleration control in the above-mentioned target gear shift stage fixed mode, during a time period in which an own vehicle is following a preceding vehicle running at vehicle speed not higher than target vehicle speed of the own vehicle.

Then, the present invention device according to further another preferable embodiment further comprises a preceding vehicle detection part which detects preceding vehicle speed that is vehicle speed of a preceding vehicle located ahead of said vehicle and inter-vehicular distance that is distance between the preceding vehicle and said vehicle. Although a specific configuration of a preceding vehicle detection part is not limited in particular as long as it is possible to detect preceding the vehicle speed and the inter-vehicular distance, for example, a millimeter wave radar etc. can be exemplified as a specific example. Furthermore, the preceding vehicle detection part may detect the preceding vehicle speed and the inter-vehicular distance themselves, or may detect parameters relevant to the preceding vehicle speed and the inter-vehicular distance and compute or presume the preceding vehicle speed and the inter-vehicular distance based on the parameters.

Furthermore, said control part is configured to adjust said vehicle speed so that said inter-vehicular distance does not become less than a predetermined lower limit by controlling a brake of said vehicle and a throttle-valve opening of said internal combustion engine and the gear shift stage of said multistep automatic transmission, at least.

In addition, said control part is configured to permit execution of said acceleration control in said target gear shift stage fixed mode when said preceding vehicle does not exist or said preceding vehicle speed exceeds said target vehicle speed, and to forbid execution of said acceleration control in said target gear shift stage fixed mode when said preceding vehicle exists and said preceding vehicle speed is not higher than said target vehicle speed.

In accordance with the present invention device according to this embodiment, during a time period in which an own vehicle is following a preceding vehicle running at vehicle speed not higher than target vehicle speed of the own vehicle by the follow-up running control, acceleration control in the above-mentioned target gear shift stage fixed mode is not carried out. As a result, a possibility that target driving force may be changed frequently due to running condition of the preceding vehicle, and a large gear shift of a multistep automatic transmission may be performed frequently, and they may lead to worsening of an operation feeling consequently, as mentioned above, is reduced effectively.

Although control based on driving force has been explained in the above, driving force is proportional to driving torque which is torque in a driving wheel, and the driving torque is proportional to engine torque which is output torque of an internal combustion engine. Therefore, the same control as the above may be performed based on driving torque in place of driving force.

Other objectives, other features and accompanying merits of the present invention will be easily understood from the following explanation about respective embodiments of the present invention that will be described referring to drawings.

DESCRIPTION OF EMBODIMENTS

Before an explanation about a cruise control device according to various embodiments of the present invention, one example of a vehicle to which the cruise control device is applied and an outline of acceleration control carried out in the vehicle by a cruise control device according to a conventional technology will be explained below.

In the following explanations, a vehicle equipped with a cruise control device which can carry out follow-up running control in addition to constant-speed running control will be exemplified. Also in explanations about cruise control devices according to various embodiments of the present invention which will be exemplified later, unless otherwise noted, each device is applied to a vehicle which has the same configuration as the above. However, it is needless to say that a vehicle does not need to have a configuration for carrying out follow-up running control when a control device is applied to an embodiment without control relevant to follow-up running control.

[1. Configuration of Vehicle]

Figure 1:
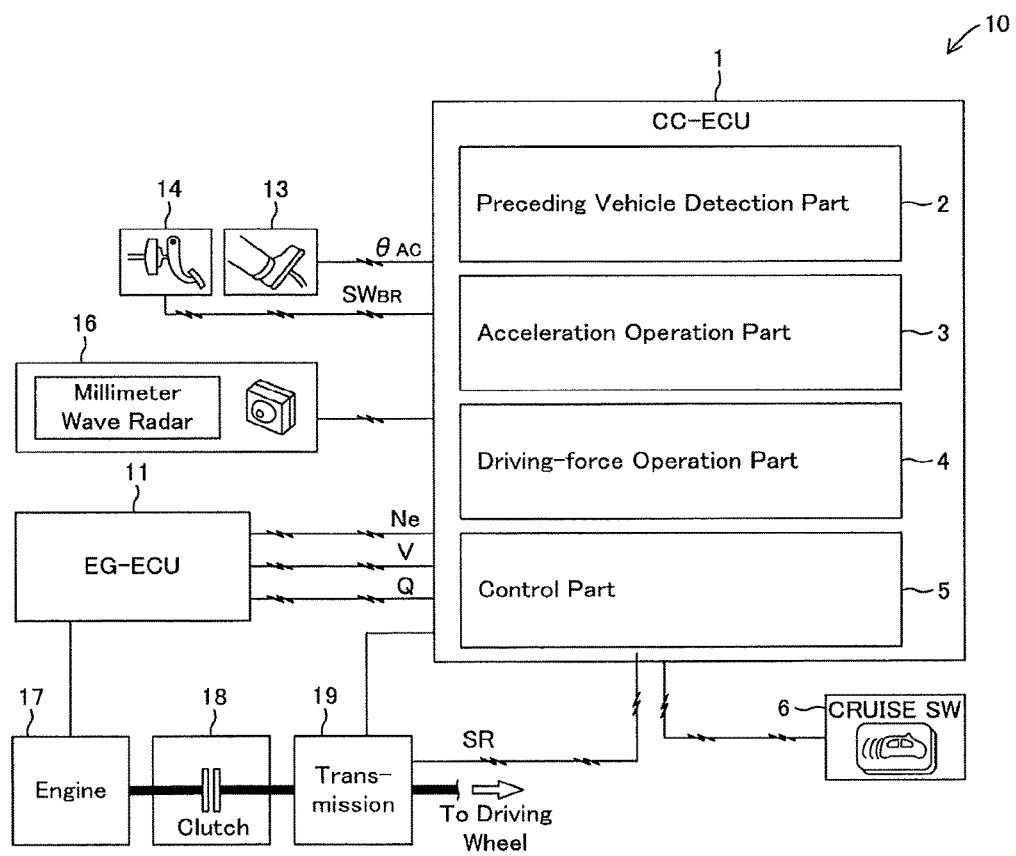
FIG. 1 is a schematic view for showing an example of a configuration of a vehicle to which a cruise control device according to a conventional technology is applied.

As an example of a vehicle to which a common cruise control device is applied, a vehicle 10 equipped with a multistep automatic transmission 19 (AT: Automatic Transmission) is exemplified in FIG. 1. This multistep automatic transmission 19 is connected to an output shaft of an internal combustion engine 17 through a clutch 18. Rotation output power of the internal combustion engine 17 is inputted into the multistep automatic transmission 19 according to the disconnected/connected state of the clutch 18, is slowed down with a predetermined reduction ratio (a gear shift stage, gear ratio), and thereafter is transmitted to downstream driving wheel side. A transmission mechanism which consists of two or more gears is prepared inside of the multistep automatic transmission 19, and thereby several gear shift stages with different reduction ratios are set.

The driving situation of the internal combustion engine 17 is controlled by an internal combustion engine control unit 11 (EG-ECU). The internal combustion engine control unit 11 is an electronic control unit which controls an quantity of air supplied to the internal combustion engine 17, a fuel consumption quantity and ignition timing, etc., and is constituted as a microcomputer equipped with, for-example, CPU, ROM and RAM, etc. The internal combustion engine control unit 11 calculates parameters for control (control parameters) based on signals transmitted from various sensors which are not shown, and controls the internal combustion engine 17 based on those control parameters.

As specific controlled objects of the internal combustion engine control unit 11, an injection quantity and injection timing of fuel injected from an injector, ignition timing in a spark plug, throttle-valve opening, etc. are mentioned. Moreover, as specific examples of control parameters calculated by the internal combustion engine control unit 11, internal combustion engine rotational speed Ne, vehicle speed V and intake air flow rate Q, etc. are mentioned. The internal combustion engine rotational speed Ne is computed based on a signal from a crank angle sensor which detects rotation angle of a crankshaft of the internal combustion engine 17, for example. Moreover, the vehicle speed V is computed, for example, based on a signal from a vehicle speed sensor, and the intake air flow rate Q is computed, for example, based on a signal from an air flow meter. Information of the computed internal combustion engine rotational speed Ne, vehicle speed V and intake air flow rate Q is transmitted to a cruise-control control unit 1 (CC-ECU) which will be mentioned later.

A shift range sensor 12, an accelerator opening sensor 13 and a brake switch 14 are prepared in this vehicle 10. The shift range sensor 12 detects a gear shift stage (shift range) SR of the multistep automatic transmission 19. The accelerator opening sensor 13 detects accelerator opening $\theta_{AC}$ corresponding to a stepping-in operation amount of the accelerator. The accelerator opening $\theta_{AC}$ is a parameter corresponding to acceleration demand by a driver.

The brake switch 14 detects the existence of a stepping-in operation of a brake pedal. In this example, for example, an ON signal ($SW_{BR}=1$) is outputted when the brake pedal is being stepped in, and an OFF signal ($SW_{BR}=0$) is outputted when there is no brake operation. Information of the gear shift stage SR of the multistep automatic transmission 19, information of the accelerator opening $\theta_{AC}$, and information $SW_{BR}$ of a stepping-in operation detected by these sensors are transmitted to the cruise-control control unit 1.

Millimeter wave radar 16 is disposed in the front end part of the vehicle 10. This millimeter wave radar 16 is a radar device which detects a preceding vehicle running ahead of the vehicle 10 as an own vehicle. The millimeter wave radar 16 irradiates a millimeter wave toward the front of the vehicle 10 and receives its reflected wave. The millimeter wave radar 16 comprises an electronic control unit, analyzes the received reflected wave, and detects distance DR (inter-vehicular distance) from an object which reflected the millimeter wave (namely, a preceding vehicle) and relative-velocity VR of the object with respective to the own vehicle. Information of the distance DR and the relative-velocity VR thus detected is transmitted to the cruise-control control unit 1.

A cruise switch 6 is disposed in a cabin of the vehicle 10. The cruise switch 6 is an input device operated by a driver at the time of an initiation of the constant-speed running control and the follow-up running control, and is a two-position switch which outputs an ON signal and an OFF signal according to, for-example, its operation state. An output signal from the cruise switch 6 is transmitted to the cruise-control control unit 1.

The cruise-control control unit 1 is an electronic control unit for carrying out the constant-speed running control and the follow-up running control, and is constituted as a microcomputer equipped with CPU, ROM and RAM, etc. like the internal combustion engine control unit 11, for example. This cruise-control control unit 1 controls the internal combustion engine 17, the multistep automatic transmission 19 and a brake based on the information transmitted from various sensors and the running condition of the vehicle 10, adjusts driving force and braking force, and carries out the constant-speed running control and the follow-up running control.

[2. Outline of Control]

The outline of the acceleration control carried out by the cruise-control control unit 1 will be explained below.

[2-1. Constant-Speed Running Control]

In the constant-speed running control, the output power and braking force of the internal combustion engine are adjusted so that the vehicle speed V is maintained constant. For example, the vehicle speed V at the time when the ON operation of the cruise switch 6 is carried out is detected by the cruise-control control unit 1, and this vehicle speed V is memorized as the target vehicle speed V0.

Moreover, the cruise-control control unit 1 computes target acceleration which is acceleration of the vehicle 10 required for making the vehicle 10 run at the target vehicle speed V0 according to alteration of actual vehicle speed V, alteration of road surface gradient and alteration of an external load, etc. Then, the cruise-control control unit 1 computes target driving force which is a driving force of the vehicle 10 corresponding to the above-mentioned target acceleration.

In addition, the cruise-control control unit 1 computes a variation pattern of demand driving force, which changes to target driving force so that the magnitude of change rate of the acceleration of the vehicle 10 does not exceed a predetermined upper limit (gradient restriction is carried out). This demand driving force is transmitted to the internal combustion engine control unit 11.

Then, the internal combustion engine control unit 11 controls the injection quantity and injection timing of fuel, the ignition timing, the intake air quantity in the internal combustion engine 17, etc. so that the demand driving force transmitted from the cruise-control control unit 1 is generated.

Moreover, when an accelerator operation is made during the constant-speed running control, driving force according to accelerator operation amount $\theta_{AC}$ is added, and the internal combustion engine 17 is controlled so that larger driving force is generated. As an exit condition for the constant-speed running control, a fact that an OFF operation of the cruise switch 6 is carried out and a fact that the output signal of the brake switch 14 is an ON signal ($SW_{BR}=1$), etc. are mentioned. In this example, when any of these conditions are satisfied, the constant-speed running control is exited (ended).

[2-2. Follow-Up Running Control]

The follow-up running control is control in which driving force and braking force are adjusted so that an inter-vehicular distance between an own vehicle and a preceding vehicle does not become less than a predetermined lower limit (that is, an own vehicle and a preceding vehicle do not get too close to each other) when the constant-speed running control is being carried out and a preceding vehicle exists ahead of the vehicle 10. In this example, driving force and braking force are adjusted so that the above-mentioned inter-vehicular distance comes to be a constant value not less than the above-mentioned lower limit. For example, when an own vehicle catches up with a preceding vehicle gradually and the preceding vehicle enters in a detection area of the millimeter wave radar 16 during the constant-speed running control, the follow-up running control is carried out in addition to the constant-speed running control.

At this time, the cruise-control control unit 1 calculates driving force required for making the relative-velocity VR be zero and maintaining the distance DR at a predetermined value (the above-mentioned constant value), etc., based on the distance DR and relative-velocity VR, which were detected by the millimeter wave radar 16, and the vehicle speed V of the own vehicle, and transmits this driving force to the internal combustion engine control unit 11 as demand driving force. On the other hand, the internal combustion engine control unit 11 controls the injection quantity and injection timing of fuel, the ignition timing, and the intake air quantity, etc. in the internal combustion engine 17 so that driving force demanded from the cruise-control control unit 1 can be obtained. As an end condition for the follow-up running control, for example, a fact that the end condition for the constant-speed running control is satisfied and a fact that a preceding vehicle is no longer detected in the detection range of the millimeter wave radar 16, etc.

[2-3. Automatic Gear Shift Control]

Automatic gear shift control is control performed in a state where the constant-speed running control or the follow-up running control is carried out. In this control, the cruise-control control unit 1 changes a gear shift stage of the multistep automatic transmission 19 to a gear shift stage suitable for obtaining driving force demanded in the constant-speed running control and the follow-up running control, according to the running condition of the vehicle 10 at that time, based on a shift line predetermined for the vehicle 10.

For example, in a case where it is judged that demanded driving force cannot be obtained at a gear shift stage at that time when large driving force is required for following up an accelerated preceding vehicle, the cruise-control control unit 1 changes a gear shift stage of the multistep automatic transmission 19 to a gear shift stage corresponding to a larger reduction ratio. Moreover, for example, also when it is judged that sufficient driving force cannot be obtained due to decrease in the vehicle speed V at the time of running on a continuous uphill, the cruise-control control unit 1 changes a gear shift stage of the multistep automatic transmission 19 to a gear shift stage corresponding to a larger reduction ratio. On the other hand, for example, when it is judged that a surplus occurs in driving force due to by increase in the vehicle speed V at the time of running on a continuous downhill, the cruise-control control unit 1 changes a gear shift stage of the multistep automatic transmission 19 to a gear shift stage corresponding to a smaller reduction ratio.

In addition, the automatic gear shift control may be performed also in a state where the constant-speed running control or the follow-up running control is not carried out. The automatic gear shift control may be performed also in a case where larger driving force is required, for example, according to accelerator operation amount $\theta_{AC}$ by a driver, etc.

[3. Control Configuration]

Figure 2:
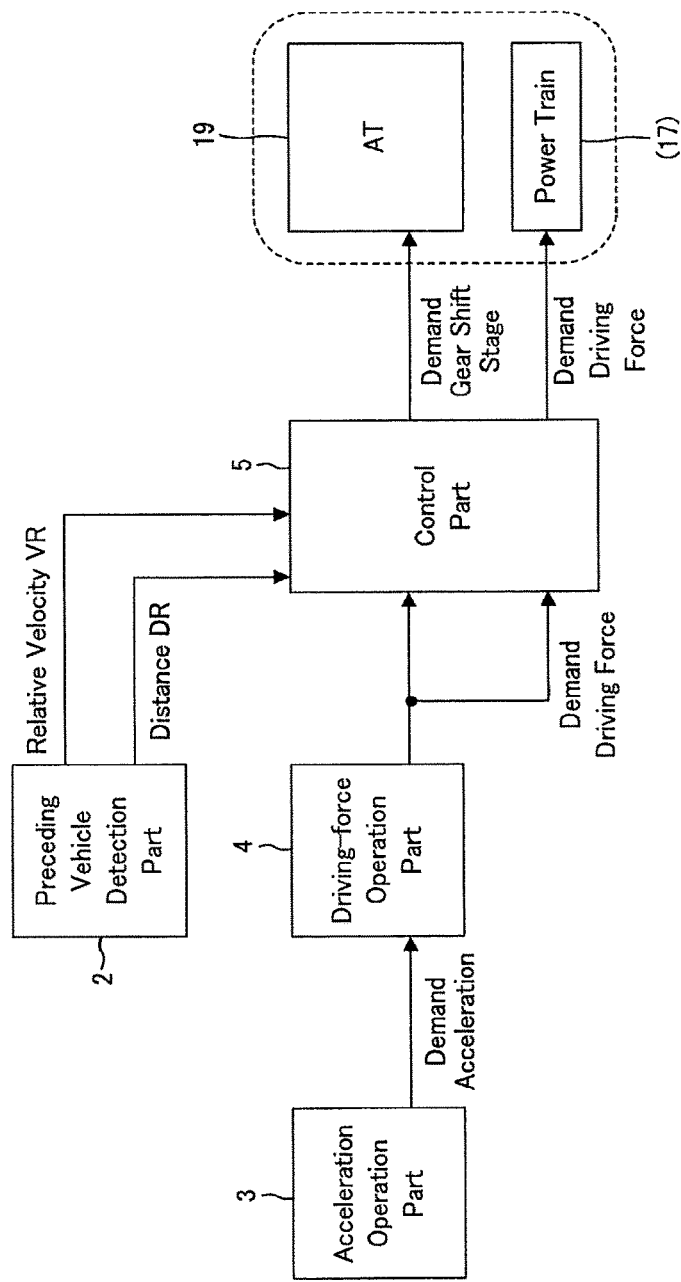
FIG. 2 is a schematic block diagram for showing a control configuration of a cruise control device according to a conventional technology.

As shown in FIG. 2, a preceding vehicle detection part 2, an acceleration operation part 3, a driving-force operation part 4 and a control part 5 are prepared in the cruise-control control unit 1 for the purpose of achievement of functions of the above-mentioned various kinds of control. Each function of these preceding vehicle detection part 2, acceleration operation part 3, driving-force operation part 4 and control part 5 may be realized by an electronic circuit (hardware), may be realized by a programmed software, or a portion of these functions may be realized by hardware and the other may be realized by software.

[3-1. Preceding Vehicle Detection Part]

The preceding vehicle detection part 2 detects a preceding vehicle speed which is vehicle speed of a preceding vehicle located ahead of the vehicle 10 that is an own vehicle and inter-vehicular distance which is distance between and the preceding vehicle the above-mentioned vehicle (own vehicle). In this example, the preceding vehicle detection part 2 calculates the distance DR and the relative-velocity VR for a preceding vehicle which exists in a detection range of the millimeter wave radar 16. The distance DR and the relative-velocity VR detected by the preceding vehicle detection part 2 are transmitted to the control part 5.

[3-2. Acceleration Operation Part]

The acceleration operation part 3 computes target acceleration (gear-shift acceleration) which is acceleration of the vehicle 10 required for accelerating vehicle speed that is a running speed of the vehicle 10 to target vehicle speed. Furthermore, in this example, the acceleration operation part 3 computes a variation pattern of demand acceleration which is acceleration required for bringing acceleration of the vehicle 10 close to the above-mentioned target acceleration so that the magnitude of change rate of acceleration of the vehicle 10 does not exceed a predetermined upper limit (vehicle-control acceleration), and transmits the variation pattern to the driving-force operation part 4.

[3-3. Driving-Force Operation Part]

The driving-force operation part 4 computes demand driving force which is driving force required for the vehicle 10 according to the variation pattern of the demand acceleration computed by the acceleration operation part 3 (vehicle-control driving force). The demand driving force computed by the driving-force operation part 4 is transmitted to the control part 5.

[3-4. Control Part]

The control part 5 controls a power train of the vehicle 10 including the internal combustion engine 17, and carries out acceleration control in which the driving force of the vehicle 10 is brought close to the demand driving force. Specifically, the control part 5 changes throttle-valve opening of the internal combustion engine 17 at least, and brings the driving force of the vehicle 10 close to the demand driving force. The control part 5 may carry out acceleration control by changing parameters, such as injection quantity and injection timing of fuel in the internal combustion engine 17, ignition timing and intake air quantity, in addition to the throttle-valve opening of the internal combustion engine 17. The control part 5 carries out acceleration control by inputting these parameters into the internal combustion engine control unit 11 (EG-ECU). As the result, the driving force of the vehicle 10 can be brought close to the target driving force.

However, during execution of the above-mentioned follow-up running control, the control part 5 computes driving force required for making the relative-velocity VR be zero and maintaining the distance DR at a predetermined constant value, etc., based on the distance DR and relative-velocity VR transmitted from the acceleration operation part 3 and the vehicle speed V of an own vehicle, and controls the power train of the vehicle 10 by using this driving force as demand driving force.

With the above, the control part 5 changes the gear shift stage of the automatic transmission 19, according to the demand driving force and the vehicle speed V, based on shift lines predetermined for the vehicle 10 (demands gear shift to AT). Therefore, there is a possibility that gear shift may be performed repeatedly until the gear shift stage of the automatic transmission 19 reaches a target gear shift stage and it may cause worsening of an operation feeling, etc., as mentioned above.

Then, in cruise control devices according to various embodiments of the present invention, which will be explained later in detail, worsening of an operation feeling, etc. is reduced by changing the gear shift stage of the automatic transmission 19 not based on demand driving force (vehicle-control driving force), but based on target driving force (gear-shift driving force).

First Embodiment

Hereafter, a cruise control device according to a first embodiment of the present invention (hereafter, may be referred to as a "first device") will be explained referring to drawings. Since the first device does not carry out control relevant to the follow-up running control, it can be applied to a vehicle equipped with a cruise control device which cannot carry out the follow-up running control. In the following explanations, difference between the above-mentioned cruise control device 1 the first device will be focused on and explained.

(Configuration)

Figure 3:
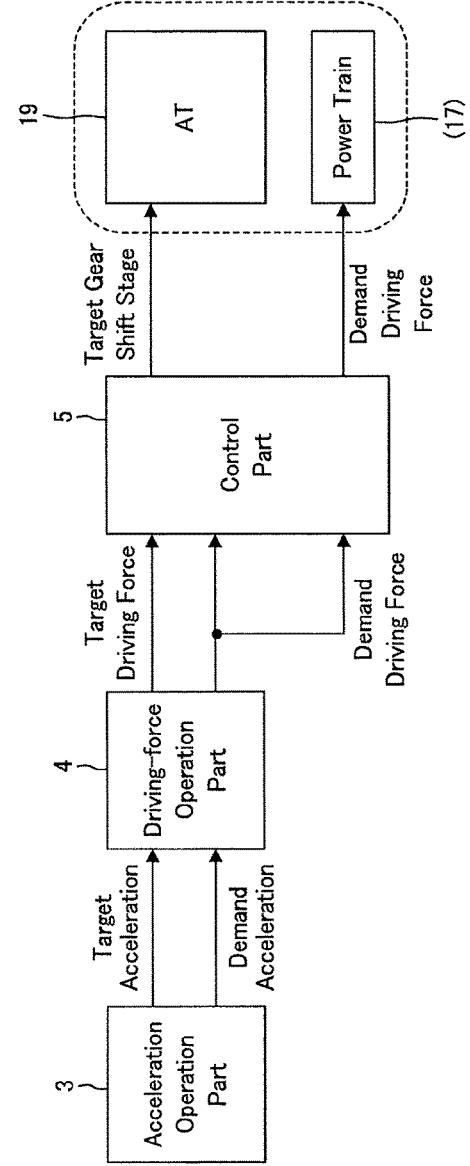
FIG. 3 is a schematic block diagram for showing a control configuration of a cruise control device according to a first embodiment of the present invention (first device).

As shown in FIG. 3, the first device has the same configuration as the above-mentioned cruise-control control unit 1 according to a conventional technology. Specifically, the first device is also comprises the acceleration operation part 3, the driving-force operation part 4 and the control part 5. However, since the first device does not carry out control relevant to the follow-up running control as mentioned above, it does not comprise the preceding vehicle detection part 2.

In addition to the above-mentioned variation pattern of demand acceleration, the acceleration operation part 3, which the first device comprises, also transmits target acceleration to the driving-force operation part 4.

The driving-force operation part 4, which the first device comprises, also computes target driving force which is driving force of the vehicle 10 corresponding to the target acceleration computed by the acceleration operation part 3 (gear-shift driving force), in addition to the above-mentioned demand driving force, and transmits it to the control part 5.

The control part 5, which the first device comprises, also controls the power train of the vehicle 10 including the internal combustion engine 17, brings the driving force of the vehicle 10 close to the demand driving force transmitted from the driving-force operation part 4, and carries out acceleration control in which the driving force of the vehicle 10 is brought close to the target driving force.

However, in the first device, the control part 5 does not change the gear shift stage of the automatic transmission 19 according to the demand driving force based on shift lines predetermined for the vehicle 10, but, first, it changes the gear shift stage of the automatic transmission 19 (AT) to a target gear shift stage which is a gear shift stage required for obtaining target driving force, at a stretch. Then, the control part 5 forbids change of the gear shift stage of the automatic transmission 19, and carries out the above-mentioned acceleration control, while maintaining the gear shift stage of the automatic transmission 19 at the target gear shift stage.

As mentioned above, in the acceleration control in a vehicle equipped with a multistep automatic transmission, the first device reduces the number of times of gear shift by changing the gear shift stage of an automatic transmission to target gear shift stage at a stretch. And, the first device avoids rapid alteration of acceleration by carrying out acceleration control accompanied by gradient restriction, while maintaining the gear shift stage of the automatic transmission at target gear shift stage. Thereby, the first device can attain target acceleration promptly, while reducing worsening of an operation feeling.

(Operation)

Here, the acceleration control carried out in the first device will be explained in detail below, referring to drawings. A flowchart for showing flow of various processing in the acceleration control which the first device carries out is shown in FIG. 4, and a time chart for showing chronological alteration (time-dependent change) of driving force, a gear shift stage and a gear shift prohibiting flag is shown in FIG. 5, respectively.

Figure 4:
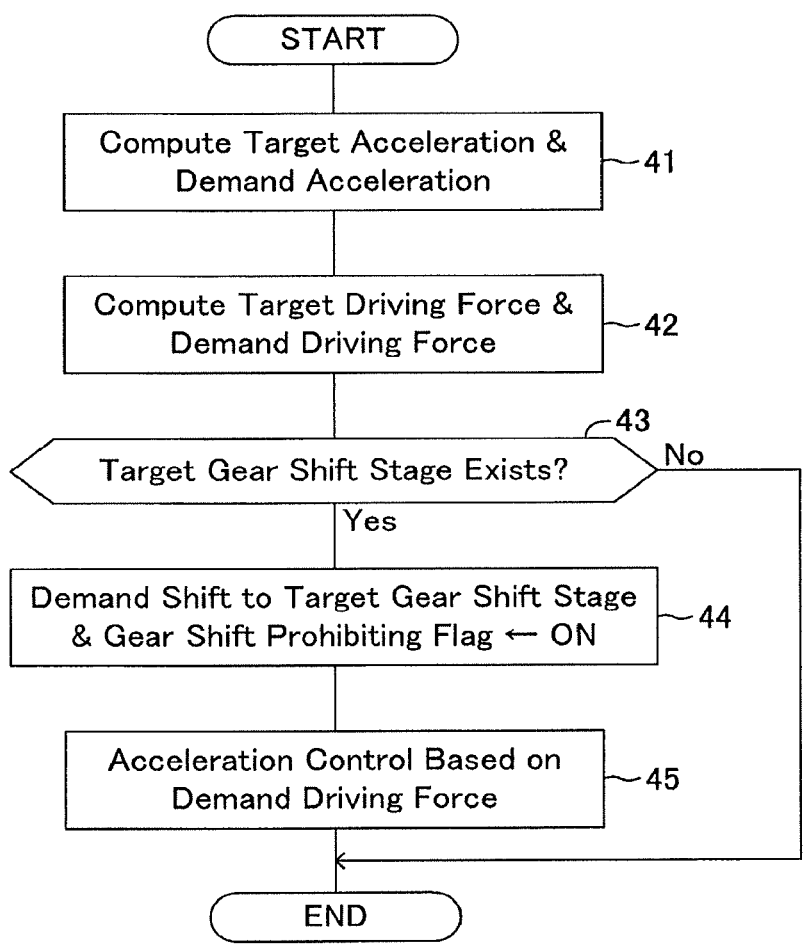
FIG. 4 is a flowchart for showing flow of various processing in an acceleration control carried out in the first device.
Figure 5:
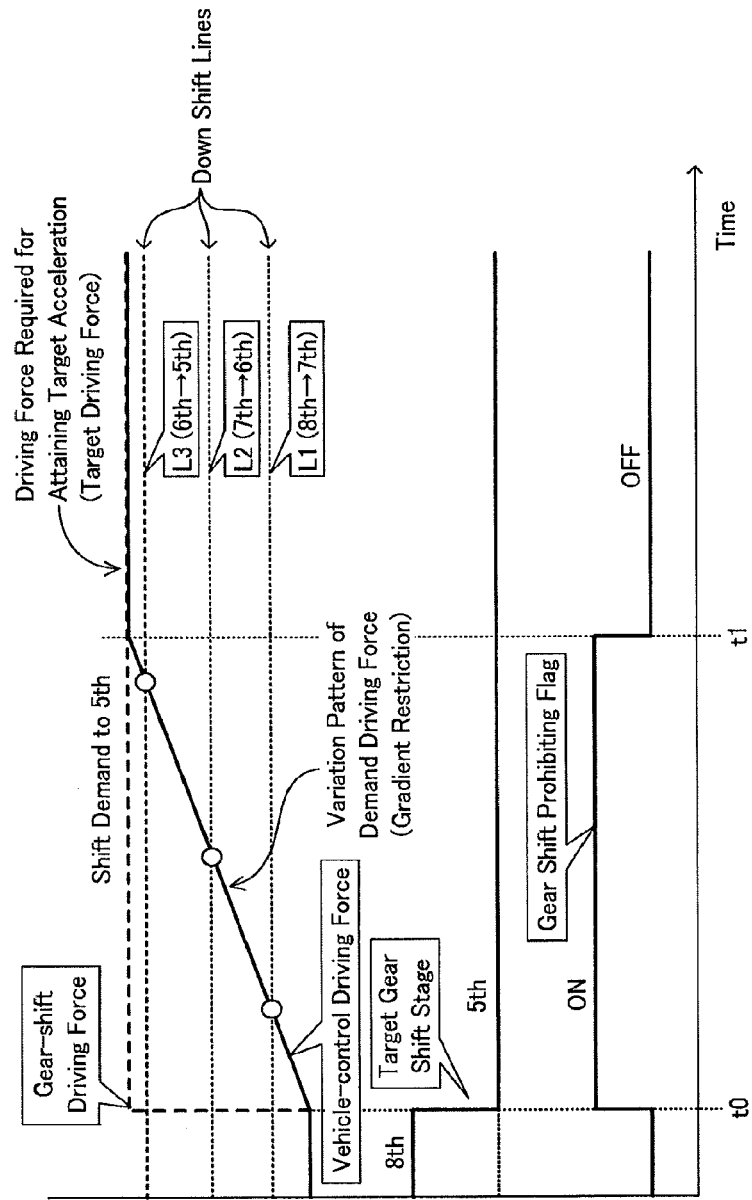
FIG. 5 is a time chart for showing chronological alteration (time-dependent change) of driving force, a gear shift stage and a gear shift prohibiting flag in the acceleration control carried out in the first device.

In the first device, an acceleration control routine represented by the flowchart shown in FIG. 4 is repeatedly performed at a predetermined time interval during execution of cruise-control control (in this example, only the constant-speed running control). In this example, it is configured so that CPU performs the routine according to a program stored in ROM which the cruise-control control unit 1 (CC-ECU) comprises.

First, in step 41, CPU computes target acceleration which is acceleration required for accelerating the vehicle 10 to the target vehicle speed V0 memorized by the cruise-control control unit 1 when the ON operation of the cruise switch 6 is carried out, for example. Furthermore, a CPU computes the variation pattern of demand acceleration which changes to target acceleration so that the magnitude of change rate of the acceleration of the vehicle 10 does not exceed a predetermined upper limit.

Next, the CPU progresses to step 42, computes target driving force which is driving force of the vehicle 10 corresponding to the target acceleration (gear-shift driving force), and computes demand driving force which is driving force of the vehicle 10 corresponding to the variation pattern of the demand acceleration (vehicle-control driving force). Thereby, the CPU can compute a variation pattern of demand driving force which changes to target driving force so that the magnitude of change rate of the acceleration of the vehicle 10 does not exceed a predetermined upper limit.

Next, the CPU progresses to step 43, and judges whether a target gear shift stage which is a gear shift stage of the automatic transmission 19 required for obtaining the target driving force exists. Specifically, the CPU judges whether a gear shift stage which has a reduction ratio more suitable for obtaining the target driving force than a current gear shift stage which is a gear shift stage of the automatic transmission 19 at present is specified as a target gear shift stage, based on the line in variable speed defined beforehand. When a target gear shift stage does not exist (not specified), the CPU judges in step 43 as "No", and ends the routine. On the other hand, when a target gear shift stage exists (specified), the CPU judges in step 43 as "Yes", and progresses to the following step 44.

In the following step 4 four the CPU changes the gear shift stage of the automatic transmission 19 from the current gear shift stage to the target gear shift stage at a stretch. Specifically, the CPU transmits a shift demand as an instruction which makes the automatic transmission 19 performs the above-mentioned gear shift to the automatic transmission 19. Furthermore, when the change of the gear shift stage of the automatic transmission 19 to the target gear shift stage has been completed, the CPU sets the gear shift prohibiting flag and forbids change of the gear shift stage of the automatic transmission 19.

Next, the CPU progresses to step 45, changes parameters, such as throttle-valve opening in the internal combustion engine 17, injection quantity and injection timing of fuel, ignition timing and intake air quantity, and carries out acceleration control. Specifically, the CPU brings the driving force of the vehicle 10 close to the demand driving force at that time by inputting these parameters into the internal combustion engine control unit 11 (EG-ECU). Since the demand driving force changes to the target driving force with a predetermined change rate, the CPU can bring the driving force of the vehicle 10 close to the target driving force. That is, acceleration control accompanied by gradient restriction can be carried out. Then, the CPU ends the routine.

By the above, the first device can attain driving force required for accelerating the vehicle speed V of the vehicle 10 to the target vehicle speed V0 (target driving force), without being accompanied by rapid alteration of acceleration which causes worsening of an operation feeling.

The above will be explained in more detail, referring to the time chart shown in FIG. 5. In this example, acceleration control in which the vehicle 10 running at the vehicle speed V in a state where the gear shift stage of the automatic transmission 19 is the eighth to the target vehicle speed V0 is started at the time t0. Furthermore, a case where the gear shift stage of the automatic transmission 19 is shifted down to the fifth in order to obtain target driving force required for accelerating the vehicle 10 to the target vehicle speed V0 is assumed. That is, the target gear shift stage in this example is the fifth.

The horizontal axis of FIG. 5 represents passage of time. The graph in the upper row is a time chart for showing chronological alteration (time-dependent change) of the driving force in the above-mentioned processing. The three straight lines L1 to L3 parallel to the horizontal axis correspond to down shift lines in a gear shift diagram, and show driving force at which shift down from the eighth to the seventh, shift down from the seventh to the sixth, and shift down from the sixth to the fifth occur, respectively. Furthermore, the graph in the middle row is a time chart for showing chronological alteration (time-dependent change) of the gear shift stage in the above-mentioned processing, and the graph in the lower row is a time chart for showing chronological alteration (time-dependent change) of the gear shift prohibiting flag in the above-mentioned processing.

As shown by the thick solid line in the graph in the upper row, in accordance with the above-mentioned gradient restriction, the vehicle-control driving force of the vehicle 10 (demand driving force) changes (increases) gradually to the target driving force during the time period from the time t0 to the time t1, so that the magnitude of change rate of the acceleration of the vehicle 10 does not exceed a predetermined upper limit. Thereby, the driving force required for accelerating the vehicle speed V of the vehicle 10 to the target vehicle speed V0 (target driving force) can be attained without being accompanied by rapid alteration of acceleration which causes worsening of an operation feeling.

By the way, in a cruise control device according to a conventional technology, as shown by the round marks in the above-mentioned graph, the gear shift stage of the automatic transmission 19 is changed step by step, according to the demand driving force, which changes gradually as mentioned above, and the vehicle speed V of the vehicle 10 at each time, based on predetermined shift lines. Therefore, in the cruise control device according to the conventional technology, there is a possibility that a gear shift shock of the multistep automatic transmission 19 may occur repeatedly during a time period until reaching the target gear shift stage (fifth), the attainment to the target acceleration may be overdue (delayed), or an overshooting of acceleration may occur.

Therefore, in the first device, while demand driving force is changed (increased) gradually to target driving force during a time period from the time t0 to the time t0 like the above, target driving force is changed at a stretch to target driving force corresponding to the target gear shift stage (fifth) at the time t0, as shown by a thick dashed line in the graph in the upper row. In association with this, as shown in the graph in the middle row, at the time t0, the gear shift stage of the automatic transmission 19 is changed from the current gear shift stage (eighth) to the target gear shift stage (fifth) at a stretch.

In addition, as shown in the graph in the lower row, at the time t0, the gear shift prohibiting flag is set (it is set to ON). Thereby, change of the gear shift stage of the automatic transmission 19 is forbidden, and it is maintained at the target gear shift stage (fifth) (target gear shift stage fixed mode). As a result, multiple occurrences of a gear shift shock of the multistep automatic transmission 19 during a time period until reaching the target gear shift stage (fifth), delay in an attainment of the target acceleration, or an occurrence of an overshooting of acceleration, as in the above-mentioned cruise control device according to a conventional technology, can be reduced.

Thereafter, the demand driving force is gradually increased to the target driving force (refer to the thick solid line in the graph in the upper row), while the gear shift stage of the automatic transmission 19 is maintained at the target gear shift stage (fifth) (refer to the graph in the middle row). Then, when the demand driving force reaches the target driving force (time t1), the increase in the demand driving force is stopped, the gear shift prohibiting flag is taken down (set to OFF) to remove the prohibition of change of the gear shift stage of the automatic transmission 19, and acceleration control is ended.

Second Embodiment

Next, a cruise control device according to the second embodiment of the present invention (hereafter, referred to as a "second device") will be explained. The second device carries out the acceleration control in the above-mentioned target gear shift stage fixed mode only when a gear shift pattern from a current gear shift stage to a target gear shift stage corresponds to either of the gear shift pattern assumed in operation of a vehicle (conformed gear shift pattern). On the other hand, when no gear shift pattern corresponding to the conformed gear shift pattern exists among the gear shift patterns from the current gear shift stage to the target gear shift stage, the acceleration control is not carried out in the target gear shift stage fixed mode, but in a normal mode in which a gear shift stage corresponding to the demand driving force at that time is chosen based on shift lines.

(Configuration)

Since the second device exemplified here is the same as the first device except that the execution mode of acceleration control is switched according to the existence of the gear shift pattern which corresponds to the conformed gear shift pattern as mentioned above, the second device has the same configuration as the first device. Therefore, explanation about the configuration of the second device will be omitted here.

(Operation)

Figure 7:
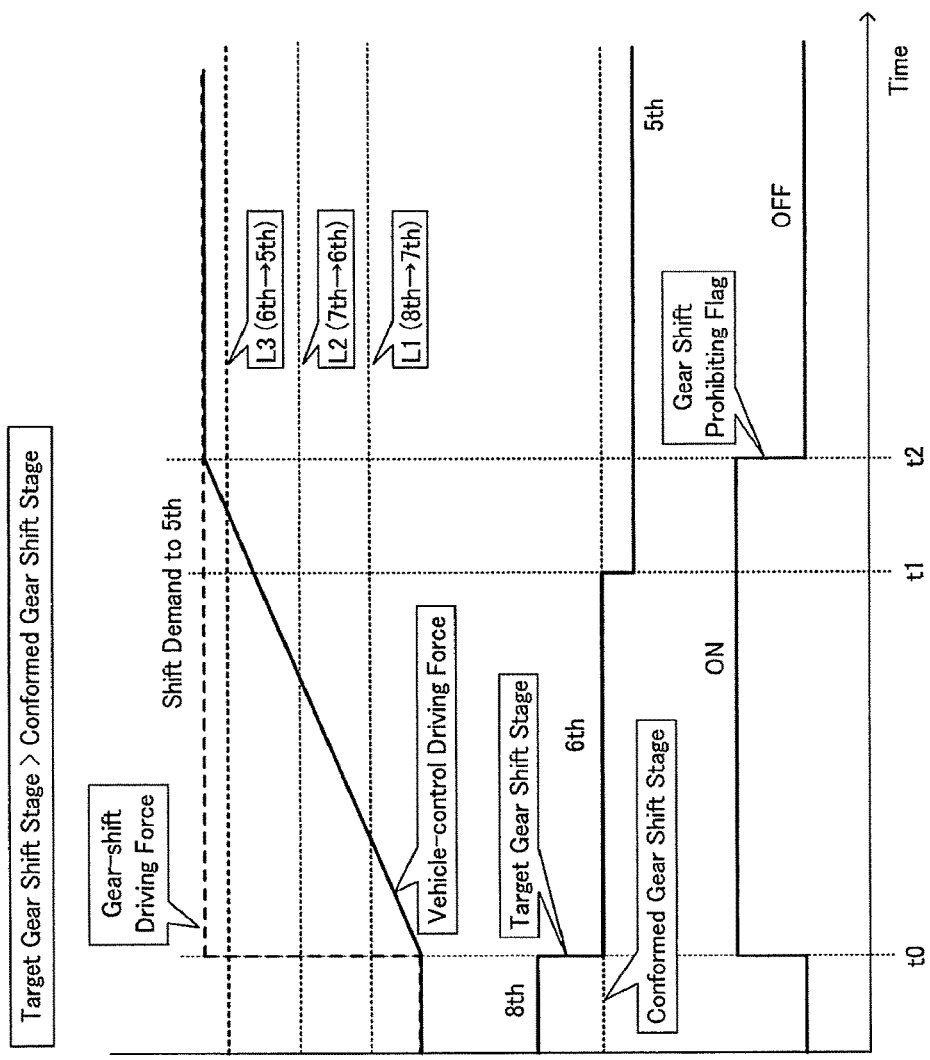
FIG. 7 is a time chart for showing chronological alteration (time-dependent change) of driving force, a gear shift stage and a gear shift prohibiting flag in a case where a conformed gear shift stage exists in acceleration control carried out in the second device.
Figure 8:
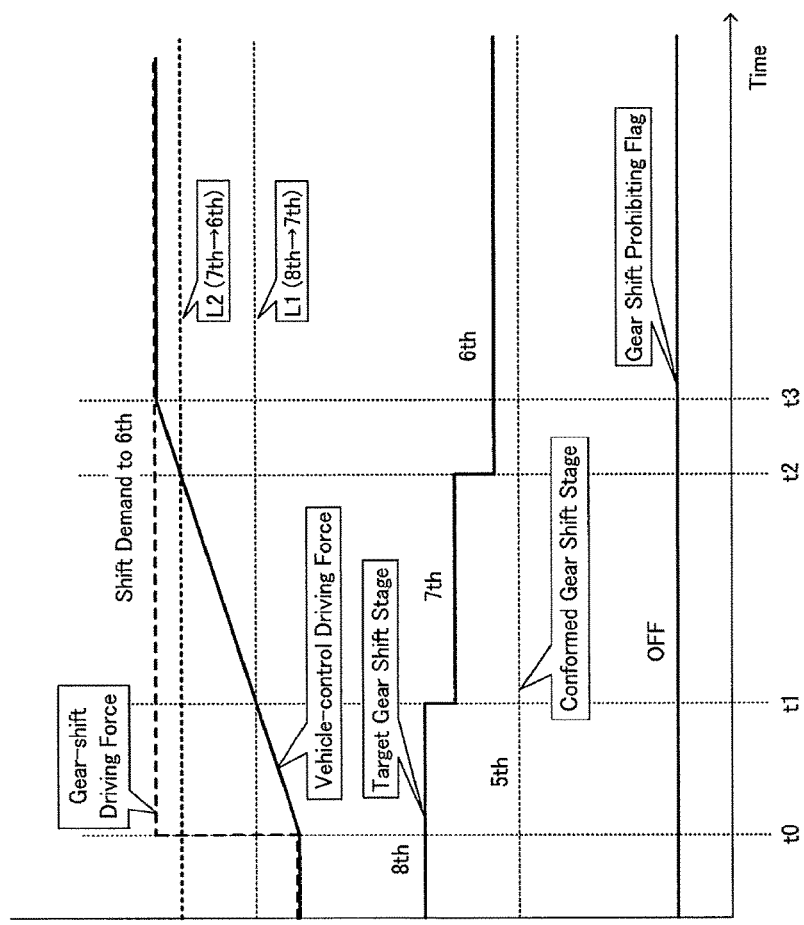
FIG. 8 is a time chart for showing chronological alteration (time-dependent change) of driving force, a gear shift stage and a gear shift prohibiting flag in a case where a conformed gear shift stage does not exist in acceleration control carried out in the second device.

Here, the acceleration control carried out in the second device will be explained in detail, referring to drawings. A flowchart for showing flow of the various processing in the acceleration control which the second device carries out is shown in FIG. 6, and a time chart for showing chronological alteration of driving force, a gear shift stage and a gear shift prohibiting flag is shown in FIGS. 7 and 8, respectively.

Figure 6:
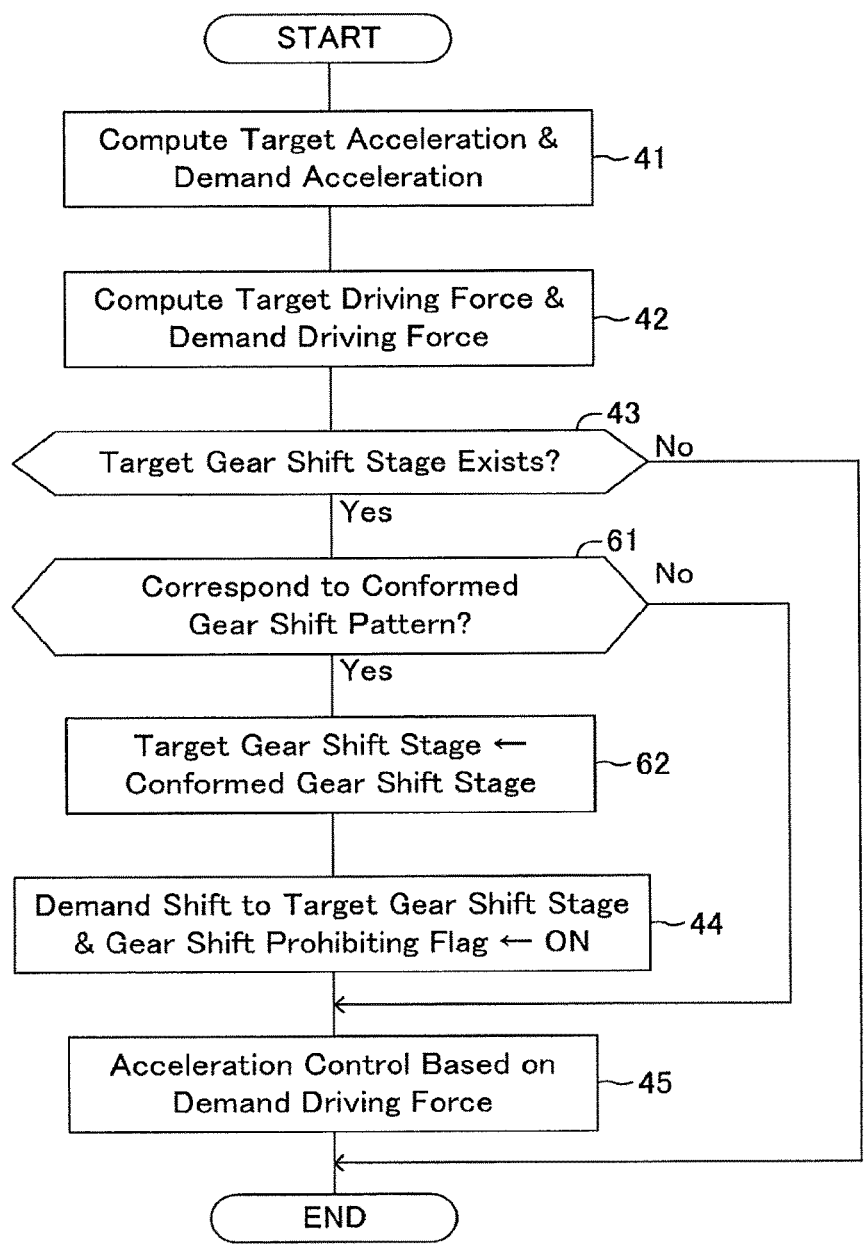
FIG. 6 is a flowchart for showing flow of various processing in an acceleration control carried out in a cruise control device according to a second embodiment of the present invention (second device).

In the second device, the acceleration control routine represented by the flowchart shown in FIG. 6 is repeatedly performed at a predetermined time interval during execution of cruise-control control (also in this example, only the constant-speed running control is performed). This flowchart is the same as the flowchart shown in FIG. 4 except that step 61 and step 62 exist between step 43 and step 4 four therefore, also in the acceleration control which the second device carries out, the CPU performs the same processing as the first device from step 41 to step 43.

When a target gear shift stage does not exist (not specified) in step 43, the CPU judges in step 43 as "No", and ends the routine. On the other hand, when a target gear shift stage exists (specified), the CPU judges in step 43 as "Yes", and progresses to the following step 61.

In the following step 61, the CPU judges whether any gear shift pattern corresponding to the conformed gear shift pattern exists among the gear shift pattern from the current gear shift stage to the target gear shift stage. When a gear shift pattern corresponding to the conformed gear shift pattern exists, the CPU judges in step 61 as "Yes", and progresses to the following step 62.

In the following step 62, the CPU sets the gear shift stage which is the change destination in the gear shift pattern corresponding to the conformed gear shift pattern as a new target gear shift stage. At this time, when two or more gear shift patterns corresponding to the conformed gear shift pattern exist, the conformed gear shift stage nearest to the target gear shift stage is set as a new target gear shift stage. Then, the CPU progresses to step 44.

In the following step 4 four the CPU changes the gear shift stage of the automatic transmission 19 from the current gear shift stage to the target gear shift stage at a stretch, as mentioned above. However, the target gear shift stage in this case (second embodiment) is a gear shift stage which corresponds to the conformed gear shift stage as mentioned above. Furthermore, when a shift demand as an instruction which performs the above-mentioned gear shift is transmitted to the automatic transmission 19 and the gear shift is completed, the CPU sets the gear shift prohibiting flag and forbids change of the gear shift stage of the automatic transmission 19.

Next, the CPU progresses to step 45, and brings the driving force of the vehicle 10 close to the demand driving force at that time by transmitting parameters, such as throttle-valve opening, injection quantity and injection timing of fuel, ignition timing and intake air quantity, etc. to the internal combustion engine control unit 11 (EG-ECU), as mentioned above. Since the demand driving force changes to the target driving force with a predetermined change rate, the CPU can bring the driving force of the vehicle 10 close to the target driving force. That is, acceleration control accompanied by gradient restriction can be carried out. Then, the CPU ends the routine.

By the above, the second device can also attain driving force (target driving force) required for accelerating the vehicle speed V of the vehicle 10 to the target vehicle speed V0, without being accompanied by rapid alteration of acceleration which causes worsening of an operation feeling. In addition, in the second device, since a gear shift pattern when changing the gear shift stage of the automatic transmission 19 from the current gear shift stage to the target gear shift stage at a stretch is limited to a conformed gear shift pattern, there is no necessity to perform conformation for all the assumed gear shift patterns, and therefore man-hour for conformation can be reduced.

On the other hand, when a gear shift pattern corresponding to the conformed gear shift pattern does not exist, the CPU judges in step 61 as "No", skips step 62 and step 44, and progresses to step 45. In step 45, the CPU carries out acceleration control accompanied by gradient restriction by inputting various parameters into the internal combustion engine control unit 11 to bring the driving force of the vehicle 10 close to the demand driving force as mentioned above, and brings the driving force of the vehicle 10 close to the target driving force. Furthermore, since step 44 is skipped, the gear shift stage of the automatic transmission 19 is changed, according to the demand driving force and the vehicle speed V of the vehicle 10, based on the predetermined shift lines, rather than is changed to the target gear shift stage at a stretch. Namely, the CPU carries out acceleration control in the normal mode. Then, the CPU ends the routine.

(When a Conformed Gear Shift Pattern Exists)

The acceleration control carried out in the second device when a conformed gear shift pattern exists will be explained in detail, referring to the time chart shown in FIG. 7. In this example, acceleration control in which the vehicle 10 running at the vehicle speed V in a state where the gear shift stage of the automatic transmission 19 is the eighth is accelerated to the target vehicle speed V0 is started at the time t0. Furthermore, a case where the gear shift stage of the automatic transmission 19 is shifted down to the fifth in order to obtain target driving force required for accelerating the vehicle 10 to the target vehicle speed V0 is assumed. That is, the target gear shift stage in this example is the fifth. In addition, as for the automatic transmission 19, a conformed pattern from the eighth to the sixth and a conformed pattern from the sixth to the fifth exist.

Also in the second device, like the first device, the vehicle-control driving force of the vehicle 10 (demand driving force) is gradually changed (increased) to the target driving force by the above-mentioned gradient restriction so that the magnitude of change rate in acceleration of the vehicle 10 does not exceed a predetermined upper limit (refer to the thick solid line in the graph in the upper row). Thereby, driving force required for accelerating the vehicle speed V of the vehicle 10 to the target vehicle speed V0 (target driving force) can be attained without being accompanied by rapid alteration of acceleration, which causes worsening of an operation feeling.

On the other hand, as for the gear-shift driving force (target driving force), since no conformed gear shift pattern from the current gear shift stage (eighth) to the target gear shift stage (fifth) does not exist as mentioned above, the second device does not change the gear shift stage of the automatic transmission 19 from the current gear shift stage (eighth) to the target gear shift stage (fifth) like the first device. Instead, as shown in the graph in the middle row, the second device performs gear shift from the eighth to the sixth by using the sixth corresponding to a conformed gear shift stage as a new target gear shift stage (time t0). Since this gear shift pattern corresponds to a conformed pattern as mentioned above, an effect by conformation, such as reduction of a gear shift shock, etc. can be attained, for example.

In addition to the above, also in the second device, the gear shift prohibiting flag is set (to ON) at the time t0, as shown in the graph in the lower row. Thereby, change of the gear shift stage of the automatic transmission 19 is forbidden, and the gear shift stage thereof is maintained at the target gear shift stage (sixth) (target gear shift stage fixed mode).

Thereafter, the demand driving force is continued to be gradually increased to the target driving force (refer to the thick solid line in the graph in the upper row), while maintaining the gear shift stage of the automatic transmission 19 at the target gear shift stage (sixth) (refer to the graph in the middle row). Then, it is configured so that a gear shift pattern from the current gear shift stage (sixth) to the target gear shift stage (fifth) corresponding to the target vehicle speed V0 at the time corresponds to the conformed gear shift pattern, in response to alteration of driving situations, such as the vehicle speed V of the vehicle 10, etc., at the time t1.

Then, the second device performs a shift demand which changes the gear shift stage of the automatic transmission 19 to the new target gear shift stage (fifth). Since this gear shift pattern also corresponds to the conformed pattern, the effect by conformation of reduction of a gear shift shock, etc. can be attained. Thereafter, when demand driving force reaches the target driving force (time t2), the second device stops increasing the demand driving force, the gear shift prohibiting flag is taken down (set to OFF) to remove the prohibition of change of the gear shift stage of the automatic transmission 19, and the acceleration control is ended.

(When No Conformed Gear Shift Pattern Exists)

Next, the acceleration control carried out in the second device when no conformed gear shift pattern exists will be explained in detail, referring to the time chart shown in FIG. 8. In this example, acceleration control in which the vehicle 10 running at the vehicle speed V in a state where the gear shift stage of the automatic transmission 19 is the eighth is accelerated to the target vehicle speed V0 is started at the time t0. Furthermore, a case where the gear shift stage of the automatic transmission 19 is shifted down to the sixth in order to obtain target driving force required for accelerating the vehicle 10 to the target vehicle speed V0 is assumed. That is, the target gear shift stage in this example is the sixth. In addition, as for the automatic transmission 19, although a conformed pattern from the eighth to the fifth exists, a conformed pattern from the eighth to the sixth does not exist.

Also in this case, the second device gradually changes (increases) the vehicle-control driving force of the vehicle 10 (demand driving force) to the target driving force by the above-mentioned gradient restriction so that the magnitude of change rate in acceleration of the vehicle 10 does not exceed a predetermined upper limit (refer to the thick solid line in the graph in the upper row). Thereby, driving force required for accelerating the vehicle speed V of the vehicle 10 to the target vehicle speed V0 (target driving force) can be attained without being accompanied by rapid alteration of acceleration, which causes worsening of an operation feeling.

On the other hand, as for the gear-shift driving force (target driving force), since a conformed gear shift pattern from the current gear shift stage (eighth) to the target gear shift stage (sixth) or lower does not exist as mentioned above, the second device does not change the gear shift stage of the automatic transmission 19 to the target gear shift stage at a stretch. Instead, the second device carries out acceleration control in the normal mode that is control mode in which the gear shift stage of the automatic transmission 19 is changed, according to the demand driving force and the vehicle speed V of the vehicle 10, based on predetermined shift lines.

As the result of the above, as shown in the graph in the middle row, the gear shift stage of the automatic transmission 19 is changed from the eighth to the seventh at the time t1 when the demand driving force crosses the down shift line L1, and the gear shift stage of the automatic transmission 19 is changed from the seventh to the sixth at the time t2 when the demand driving force crosses the down shift line L2. Thereafter, when the demand driving force reaches the target driving force (time t3), an increasing of the demand driving force is stopped, and acceleration control is ended.

As mentioned above, in the second device, since the normal acceleration control is carried out when a conformed gear shift pattern does not exist, the gear shift prohibiting flag is not set (it remains OFF), as shown in the graph in the lower row shows. Therefore, since the gear shift stage of the automatic transmission 19 is changed step by step based on the predetermined shift lines, no effect associated with changing the gear shift stage of the automatic transmission 19 at a stretch is obtained. However, effects, such as reduction of the gear shift shock resulting from the gear shift pattern which does not correspond to the conformed gear shift pattern, is attained.

Third Embodiment

Next, a cruise control device according to the third embodiment of the present invention (hereafter, referred to as a "third device") will be explained. The third device is configured not to perform gear shift when target driving force can be obtained at a current gear shift stage and, thereby, the number of times of gear shift in acceleration control is ultimately reduced.

(Configuration)

Since the second device exemplified here is the same as the first device except that gear shift is not performed when target driving force can be obtained at a current gear shift stage, the second device has the same configuration as the first device. Therefore, explanation about the configuration of the third device will be omitted here.

(Operation)

Here, the acceleration control carried out in the third device will be explained in detail, referring to drawings. A flowchart for showing flow of the various processing in the acceleration control which the third device carries out is shown in FIG. 9, and a time chart for showing chronological alteration of driving force, a gear shift stage and a gear shift prohibiting flag is shown in FIG. 10, respectively.

Figure 9:
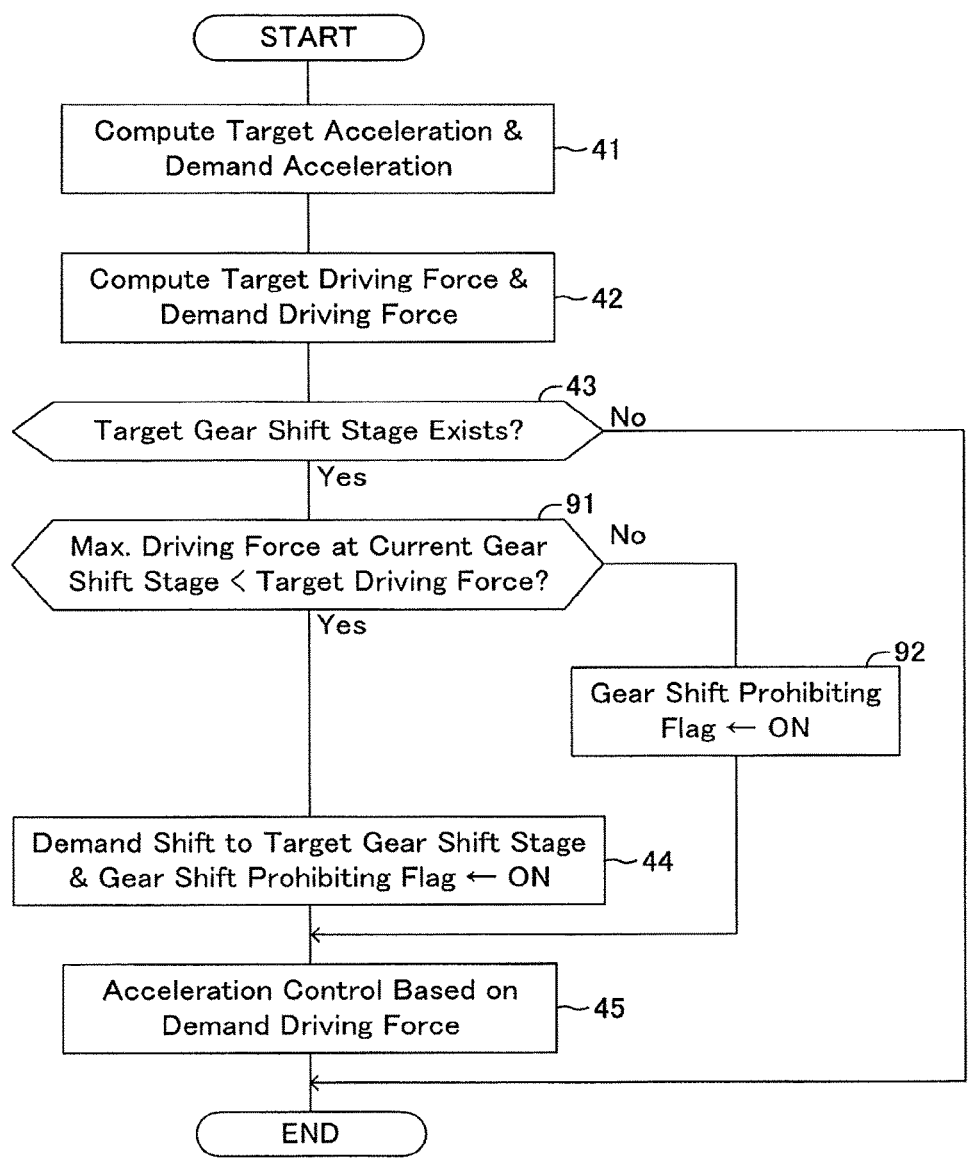
FIG. 9 is a flowchart for showing flow of various processing in acceleration control carried out in a cruise control device according to a third embodiment of the present invention (the third device).
Figure 10:
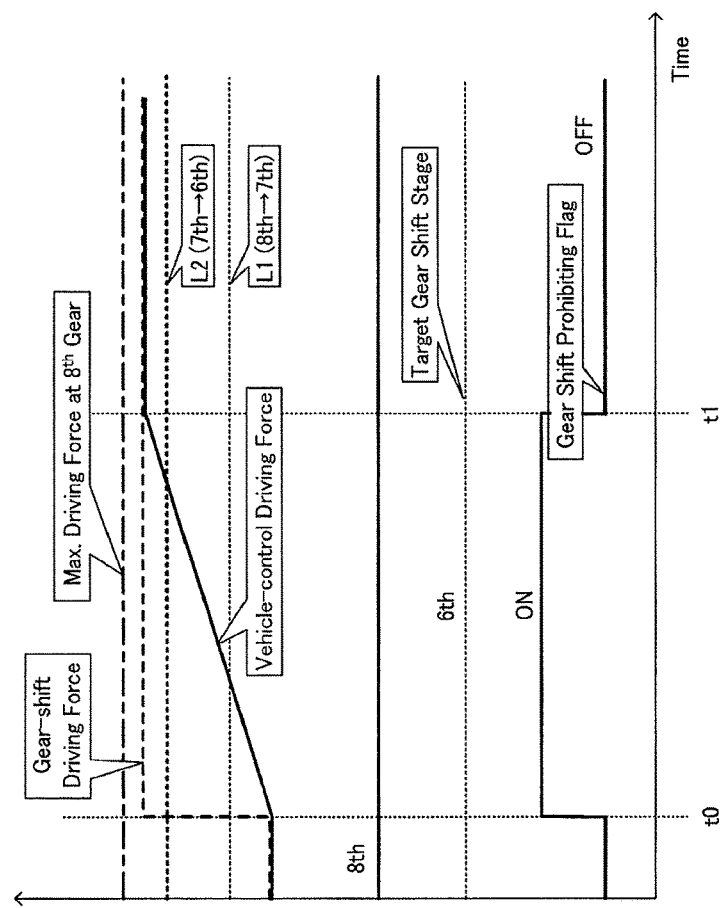
FIG. 10 is a time chart for showing chronological alteration (time-dependent change) of driving force, a gear shift stage and a gear shift prohibiting flag in a case where a conformed gear shift stage does exists in acceleration control carried out in the third device.

In the third device, the acceleration control routine represented by the flowchart shown in FIG. 9 is repeatedly performed at a predetermined time interval during execution of cruise-control control (also in this example, only the constant-speed running control is performed). This flowchart is the same as the flowchart shown in FIG. 4 except that step 91 is added between step 43 and step 44 and step 44 is skipped by step 92 when a judgment result in step 91 is "No." Therefore, also in the acceleration control which the third device carries out, the CPU performs the same processing as the first device from step 41 to step 43.

When a target gear shift stage does not exist (not specified) in step 43, the CPU judges in step 43 as "No", and ends the routine. On the other hand, when a target gear shift stage exists (specified), the CPU judges in step 43 as "Yes", and progresses to the following step 91.

In step 91, the CPU judges whether a gear shift is indispensable in order to obtain the target driving force computed in step 42. In other words, the CPU compares the maximum driving force which can be demonstrated at the current gear shift stage with the target driving force, and judges whether the target driving force is larger than the maximum driving force.

When the target driving force is larger than the above-mentioned maximum driving force and gear shift is indispensable, the CPU judges in step 91 as "Yes", and progresses to the following step 44. In this case, the processing performed in step 44 and step 45 is the same as that of the first device.

On the other hand, the above-mentioned maximum driving force is larger than the target driving force and the target driving force can be obtained even when the gear shift stage is not changed and the current gear shift stage is maintained, the CPU judges in step 91 as "No", and progresses to the following step 92. In step 92, the CPU sets the gear shift prohibiting flag, while maintaining the gear shift stage of the automatic transmission 19 at the current gear shift stage, and forbids change of the gear shift stage of the automatic transmission 19. Then, the CPU skips step 44 and progresses to step 45. The processing performed in step 45 is the same as that of the first device.

In the above-mentioned case, the CPU gradually increases demand driving force to the power train while maintaining the gear shift stage of the automatic transmission 19 at the current gear shift stage. Thereby, the third device can attain target driving force, while reducing the number of times of a gear shock ultimately.

(When Target Driving Force can be Attained at a Current Gear Shift Stage)

Acceleration control carried out in the third device when target driving force can be attained at current gear shift stage will be explained in detail, referring to the time chart shown in FIG. 10. In this example, acceleration control in which the vehicle 10 running at the vehicle speed V in a state where the gear shift stage of the automatic transmission 19 is the eighth is accelerated to the target vehicle speed V0 is started at the time t0. Furthermore, a case where it is possible to obtain the above-mentioned target driving force at the current gear shift stages (eighth) although target gear shift stage which is gear shift stage of the automatic transmission 19 suitable for obtaining target driving force required to accelerate the vehicle 10 to the target vehicle speed V0 is the sixth is assumed Also in the third device, like the first device, the vehicle-control driving force of the vehicle 10 (demand driving force) is gradually changed (increased) to the target driving force by the above-mentioned gradient restriction so that the magnitude of change rate in acceleration of the vehicle 10 does not exceed a predetermined upper limit (refer to the thick solid line in the graph in the upper row). Thereby, driving force required for accelerating the vehicle speed V of the vehicle 10 to the target vehicle speed V0 (target driving force) can be attained without being accompanied by rapid alteration of acceleration, which causes worsening of an operation feeling.

On the other hand, in this example, it is possible to obtain target driving force (gear-shift driving force) at the current gear shift stage (eighth), as mentioned above (refer to the thick dashed line and alternate long and short dash line in the graph in the upper row). Therefore, the third device sets the gear shift prohibiting flag (to ON) at the time t0 as shown in the graph in the lower row, while maintaining the gear shift stage of the automatic transmission 19 at the current gear shift stage (eighth) as shown in the graph in the middle row. Thereby, change of the gear shift stage of the automatic transmission 19 is forbidden, and it is maintained at the current gear shift stage (eighth) (current gear shift stage fixed mode).

Thereafter, the demand driving force is continued to be increased gradually to the target driving force (refer to the thick solid line in the graph in the upper row), while maintaining the gear shift stage of the automatic transmission 19 at the current gear shift stage (eighth) (refer to the graph in the middle row). Then, at the time t1, since the demand driving force reaches the target driving force, the increase of the demand driving force is stopped, and the gear shift prohibiting flag is taken down (set to OFF) to remove the prohibition of change of the gear shift stage of the automatic transmission 19, and the acceleration control is ended.

Fourth Embodiment

Hereafter, a cruise control device according to the fourth embodiment of the present invention (hereafter, referred to as a "fourth device") will be explained, referring to drawings. The fourth device is an adaptive cruise control device which carries out not only the constant-speed running control, but also the follow-up running control, and forbids execution of acceleration control in the above-mentioned target gear shift stage fixed mode when a preceding vehicle having vehicle speed later than the target vehicle speed V0 of the own vehicle 10 exists. In the following explanation, the difference between the fourth device and the first device will be focused on and explained.

(Configuration)

Figure 11:
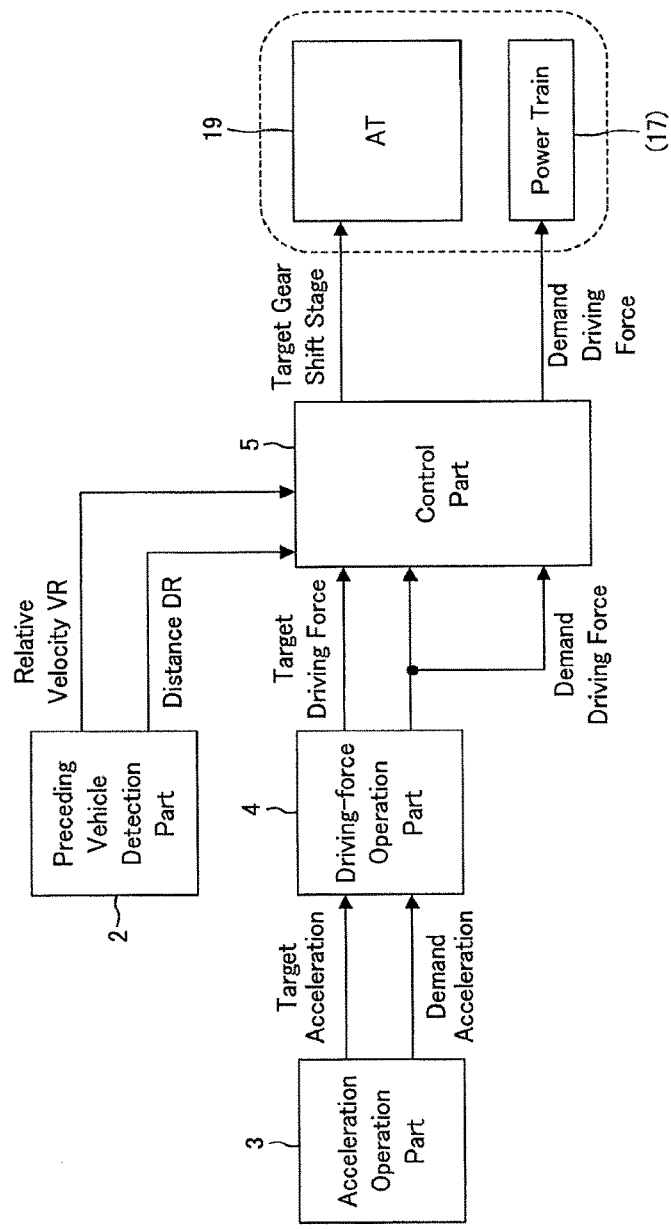
FIG. 11 is a schematic block diagram for showing a control configuration of a cruise control device according to a fourth embodiment of the present invention (fourth device).

As shown in FIG. 11, the fourth device has the same configuration as the above-mentioned cruise-control control unit 1 according to a conventional technology. Specifically, the fourth device also comprises the preceding vehicle detection part 2, the acceleration operation part 3, the driving-force operation part 4 and the control part 5. Therefore, the configuration of the fourth device is the same as the configuration of the first device, except that the fourth device comprises the preceding vehicle detection part 2.

The preceding vehicle detection part 2, which the fourth device comprises, calculates the distance DR and the relative-velocity VR for a preceding vehicle which exists in the detection range of the millimeter wave radar 16 which the vehicle 10 comprises, and transmits them to the control part 5.

The acceleration operation part 3, which the fourth device comprises, also transmits the target acceleration to the driving-force operation part 4, in addition to a variation pattern of the demand acceleration.

The driving-force operation part 4, which the fourth device comprises, also computes the target driving force which is driving force of the vehicle 10 corresponding to the target acceleration computed by the acceleration operation part 3 (gear-shift driving force), in addition to the demand driving force, and transmits them to the control part 5.

The control part 5, which the fourth device comprises, also controls the power train of the vehicle 10 including the internal combustion engine 17, brings the driving force of the vehicle 10 close to the demand driving force transmitted from the driving-force operation part 4, and carries out acceleration control in which the driving force of the vehicle 10 is brought close to the target driving force. In addition, after changing the gear shift stage of the automatic transmission 19 (AT) to the target gear shift stage at a stretch, the control part 5 forbids change of the gear shift stage of the automatic transmission 19, and carries out the above-mentioned acceleration control while maintaining the gear shift stage of the automatic transmission 19 at the target gear shift stage. That is, the fourth device can also carry out acceleration control in the target gear shift stage fixed mode.

However, as mentioned above, during a time period in which the own vehicle 10 is following a preceding vehicle running at vehicle speed not higher than the target vehicle speed V0 of the own vehicle 10, the vehicle speed V of the own vehicle 10 is adjusted so that the distance DR between the preceding vehicle and the own vehicle 10 does not become less than a predetermined lower limit (the target driving force of the own vehicle 10 is adjusted). Therefore, depending on running condition of the preceding vehicle, the target driving force may be changed frequently in the acceleration control in the above-mentioned target gear shift stage fixed mode, and the target gear shift stage of the multistep automatic transmission 19 may also be changed frequently. As a result, there is a possibility that a large gear shift, such as a shift down to the first gear (low gear), for example, may be performed frequently, and there is a possibility that it may lead to worsening of an operation feeling.

Then, the control part 5, which the fourth device comprises, permits execution of the acceleration control in the target gear shift stage fixed mode when a preceding vehicle does not exist or the preceding vehicle speed (that is the vehicle speed of the preceding vehicle) exceeds the target vehicle speed V0, and does not carry out the acceleration control in the target gear shift stage fixed mode when a preceding vehicle exists and the preceding vehicle speed is not higher than the target vehicle speed V0. Thereby, in the fourth device, a possibility that the target driving force may be changed frequently due to the running condition of the preceding vehicle, and a large gear shift of the multistep automatic transmission 19 may be performed frequently, and they may lead to worsening of an operation feeling consequently, as mentioned above, is reduced effectively.

(Operation)

Figure 12:
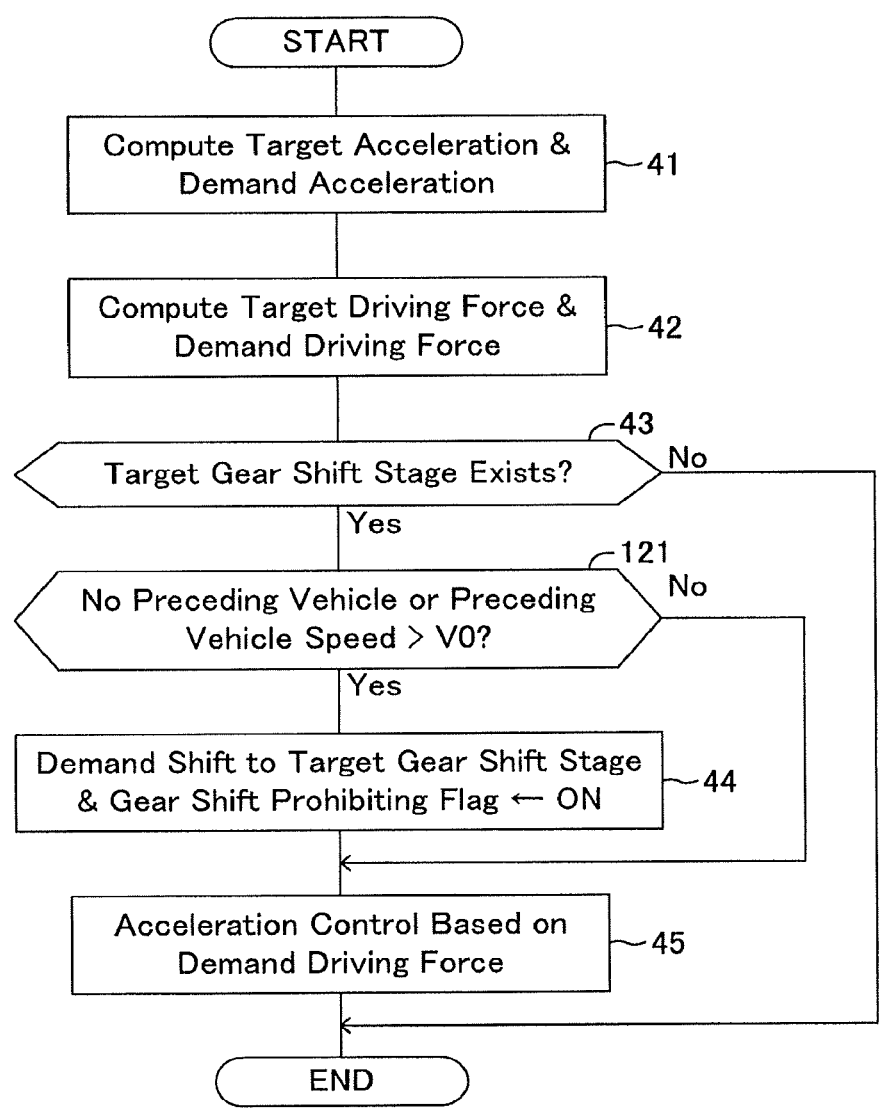
FIG. 12 is a flowchart for showing flow of various processing in acceleration control carried out in the fourth device.

In the fourth device, the acceleration control routine represented by the flowchart shown in FIG. 12 is repeatedly performed at a predetermined time interval during execution of cruise-control control (in this example, not only the constant-speed running control, but also the follow-up running control is performed). Also in this example, it is configured so that the CPU performs the routine according to the program stored in ROM which the cruise-control control unit 1 (CC-ECU) comprises.

This flowchart is the same as the flowchart shown in FIG. 4 except that step 121 exists between step 43 and step 44. Therefore, also in the acceleration control which the fourth device carries out, the CPU performs the same processing as the first device from step 41 to step 43.

When a target gear shift stage does not exist (not specified) in step 43, the CPU judges in step 43 as "No", and ends the routine. On the other hand, when a target gear shift stage exists (specified), the CPU judges in step 43 as "Yes", and progresses to the following step 121.

In the following step 121, the CPU judges whether either one of a condition "a preceding vehicle does not exist ahead of the own vehicle 10" and a condition "a preceding vehicle exists, but its vehicle speed (preceding vehicle speed) is faster than the target vehicle speed V0 of the own vehicle 10" is satisfied. In other words, in step 121, the CPU judges whether a preceding vehicle slower than the target vehicle speed V0 of the own vehicle 10 does not exist ahead of the own vehicle 10.

When a preceding vehicle slower than the target vehicle speed V0 of the own vehicle 10 does not exist ahead of the own vehicle 10, the CPU judges in step 121 as "Yes", and progresses to following step 44 and step 45. The processing performed in step 44 and step 45 is the same as that of the first device. Namely, the CPU carries out acceleration control in the above-mentioned target gear shift stage fixed mode. In addition, when possible, the CPU may carry out acceleration control in the target gear shift stage fixed mode according to a conformed gear shift pattern like the second device. Then, the CPU ends the routine.

On the other hand, when a preceding vehicle slower than the target vehicle speed V0 of the own vehicle 10 exists ahead of the own vehicle 10, the CPU judges in step 121 as "No", skips step 44, and progresses to step 45. In this case, the CPU carries out acceleration control in the normal mode. In addition, when possible, like the third device, the CPU may carry out acceleration control in the current gear shift stage fixed mode, in placed of the normal mode. Then, the CPU ends the routine.

In the cruise control devices according to the various embodiments of the present invention which have been explained above, when carrying out gradient restriction, the acceleration operation part computes a variation pattern of acceleration so that the magnitude of change rate of acceleration until the acceleration of the vehicle reaches the target acceleration may not exceed a predetermined upper limit, and the driving-force operation part computes a variation pattern of demand driving force corresponding to the computed variation pattern of acceleration.

However, as mentioned above, it may be configured so that the driving-force operation part computes the variation pattern of demand driving force so that the magnitude of change rate of demand driving force until driving force (in a driving wheel) of a vehicle reaches the target driving force does not exceed a predetermined upper limit. Alternatively, when acceleration control is carried out based on driving torque (that is torque in a driving wheel) in place of driving force, the variation pattern of driving torque may be computed so that the magnitude of change rate of driving torque until the driving torque reaches the target driving torque corresponding to the target driving force does not exceed a predetermined upper limit.

As mentioned above, although some embodiments and modifications which have specific configurations have been explained for the purpose of explaining the present invention, sometimes referring to the accompanying drawings, it should not be interpreted that the scope of the present invention is limited to these exemplary embodiments and modifications, and it is needless to say that any modifications can be properly added within the limits of the matter described in the claims and the specification.

REFERENCE SIGNS LIST

1: Cruise-control Control Unit (CC-ECU), 2: Preceding Vehicle Detection Part, 3: Acceleration Operation Part, 4: Driving-force Operation Part, 5: Control Part, 6: Cruise Switch, 10: Vehicle, 11: Internal Combustion Engine Control Unit (EG-ECU), 16: Millimeter Wave Radar, 17: Internal Combustion Engine, and 19: Multistep Automatic Transmission.

The invention claimed is:

1. A cruise control device applied to a vehicle equipped with an internal combustion engine and a multistep automatic transmission, and comprising:

an acceleration operation part which computes target acceleration that is said vehicle's acceleration required for accelerating vehicle speed which is a running speed of said vehicle to target vehicle speed, a driving-force operation part which computes target driving force that is said vehicle's driving force corresponding to said target acceleration, and computes demand driving force that changes to said target driving force so that magnitude of a change rate of acceleration or driving force or driving torque of said vehicle does not exceed a predetermined upper limit, a control part which carries out acceleration control in which the driving force of said vehicle is brought close to said target driving force by changing a throttle valve opening of said internal combustion engine at least to bring the driving force of said vehicle close to said demand driving force, wherein:

said control part is configured to carry out said acceleration control in a target gear shift stage fixed mode that is a control mode in which said acceleration control is carried out in a state where change of a gear shift stage of said automatic transmission is forbidden after changing the gear shift stage of said automatic transmission from a current gear shift stage that is a gear shift stage of said automatic transmission at present to a target gear shift stage that is a gear shift stage of said automatic transmission required for obtaining said target driving force at a stretch.

2. The cruise control device according to claim 1, wherein:
said control part is configured to:
when there is one or more candidate gear shift stages corresponding to a conformed gear shift stage that is a gear shift stage to which a direct change from said current gear shift stage is previously assumed in said vehicle among candidate gear shift stages that are gear shift stages included in a group which consists of said target gear shift stage and gear shift stages existing between said current gear shift stage and said target gear shift stage, set, as a new target gear shift stage, a candidate gear shift stage nearest to said target gear shift stage among said one or more candidate gear shift stages, and carry out said acceleration control in said target gear shift stage fixed mode, and
when there is no candidate gear shift stage corresponding to said conformed gear shift stage among said candidate gear shift stages, carry out said acceleration control in a normal mode that is a control mode in which the gear shift stage of said automatic transmission is changed, according to said demand driving force and said vehicle speed, based on a predetermined shift line.

3. The cruise control device according to claim 1, wherein:
said control part is configured to carry out said acceleration control at a current gear shift stage fixed mode that is a control mode in which said acceleration control is carried out in a state where the gear shift stage of said automatic transmission is maintained at said current gear shift stage, when maximum driving force which can be obtained in said current gear shift stage is not less than said target driving force.

4. The cruise control device according to claim 1, wherein:
said cruise control device further comprises a preceding vehicle detection part which detects preceding vehicle speed that is vehicle speed of a preceding vehicle located ahead of said vehicle and inter-vehicular distance that is distance between the preceding vehicle and said vehicle,
said control part is configured to adjust said vehicle speed so that said inter-vehicular distance does not become less than a predetermined lower limit by controlling a brake of said vehicle and the throttle-valve opening of said internal combustion engine and the gear shift stage of said multistep automatic transmission, at least, and
said control part is further configured to:
permit execution of said acceleration control in said target gear shift stage fixed mode, when said preceding vehicle does not exist or said preceding vehicle speed exceeds said target vehicle speed, and
forbid execution of said acceleration control in said target gear shift stage fixed mode, when said preceding vehicle exists and said preceding vehicle speed is not higher than said target vehicle speed.

5. The cruise control device according to claim 3, wherein:
said cruise control device further comprises a preceding vehicle detection part which detects preceding vehicle speed that is vehicle speed of a preceding vehicle located ahead of said vehicle and inter-vehicular distance that is distance between the preceding vehicle and said vehicle,
said control part is configured to adjust said vehicle speed so that said inter-vehicular distance does not become less than a predetermined lower limit by controlling a brake of said vehicle and the throttle-valve opening of said internal combustion engine and the gear shift stage of said multistep automatic transmission, at least, and
said control part is further configured to:
permit execution of said acceleration control in said target gear shift stage fixed mode, when said preceding vehicle does not exist or said preceding vehicle speed exceeds said target vehicle speed, and
forbid execution of said acceleration control in said target gear shift stage fixed mode, when said preceding vehicle exists and said preceding vehicle speed is not higher than said target vehicle speed.

6. The cruise control device according to claim 2, wherein:
said control part is configured to carry out said acceleration control at a current gear shift stage fixed mode that is a control mode in which said acceleration control is carried out in a state where the gear shift stage of said automatic transmission is maintained at said current gear shift stage, when maximum driving force which can be obtained in said current gear shift stage is not less than said target driving force.

7. The cruise control device according to claim 2, wherein:
said cruise control device further comprises a preceding vehicle detection part which detects preceding vehicle speed that is vehicle speed of a preceding vehicle located ahead of said vehicle and inter-vehicular distance that is distance between the preceding vehicle and said vehicle,
said control part is configured to adjust said vehicle speed so that said inter-vehicular distance does not become less than a predetermined lower limit by controlling a brake of said vehicle and the throttle-valve opening of said internal combustion engine and the gear shift stage of said multistep automatic transmission, at least, and
said control part is further configured to:
permit execution of said acceleration control in said target gear shift stage fixed mode, when said preceding vehicle does not exist or said preceding vehicle speed exceeds said target vehicle speed, and
forbid execution of said acceleration control in said target gear shift stage fixed mode, when said preceding vehicle exists and said preceding vehicle speed is not higher than said target vehicle speed.

* * * * *